United States Patent
McConnell

(10) Patent No.: US 11,109,449 B1
(45) Date of Patent: Aug. 31, 2021

(54) WIRELESS COMMUNICATION FOR VEHICLE BASED NODE

(71) Applicant: Blu Wireless Technology Limited, Bristol (GB)

(72) Inventor: Raymond Mark McConnell, Bristol (GB)

(73) Assignee: Blu Wireless Technology Limited, Bristol (GB)

( * ) Notice: Subject to any disclaimer, the term of this patent is extended or adjusted under 35 U.S.C. 154(b) by 0 days.

(21) Appl. No.: 16/804,744

(22) Filed: Feb. 28, 2020

(51) Int. Cl.
| | |
|---|---|
| H04W 88/06 | (2009.01) |
| H04B 7/06 | (2006.01) |
| H04W 48/18 | (2009.01) |
| H04W 84/00 | (2009.01) |
| H04B 7/0408 | (2017.01) |
| H04W 76/15 | (2018.01) |
| H04W 16/28 | (2009.01) |
| H04L 29/06 | (2006.01) |

(52) U.S. Cl.
CPC .......... *H04W 88/06* (2013.01); *H04B 7/0408* (2013.01); *H04B 7/0695* (2013.01); *H04L 69/14* (2013.01); *H04W 16/28* (2013.01); *H04W 48/18* (2013.01); *H04W 76/15* (2018.02); *H04W 84/005* (2013.01)

(58) Field of Classification Search
CPC .................................................... H04W 88/06
See application file for complete search history.

(56) References Cited

U.S. PATENT DOCUMENTS

| | | | | |
|---|---|---|---|---|
| 2011/0275378 | A1* | 11/2011 | Kwon | H04W 36/32 455/437 |
| 2019/0230500 | A1* | 7/2019 | Goncalves | H04W 36/14 |

* cited by examiner

*Primary Examiner* — Sulaiman Nooristany
(74) *Attorney, Agent, or Firm* — Optimus Patents US, LLC

(57) ABSTRACT

A communication system for supporting communication for a vehicle (103) includes a plurality of fixed network segments. Communication from access points (109) to wireless modems (111) uses mm wave radio communication links. The fixed network and vehicle comprise segment multipath controllers (1007, 1101) coupled to the wireless modems or access points (109) for multipath communication with each other. Different segments have different segment multipath controllers (1007). Root multipath controllers (1103) are included having multipath connections coupled to the plurality of segment multipath controllers (1101) and being arranged to perform multipath communication with a complementary root multipath controller (1009) of the fixed network (107). The hierarchical multipath controller approach may provide efficient adaptation to network configuration changes caused by vehicle movement.

22 Claims, 13 Drawing Sheets

WIRELESS COMMUNICATION FOR VEHICLE BASED NODE

FIELD OF THE INVENTION

The invention relates to support of communication with a vehicle-based node, and in particular, but not exclusively, to wireless communication for a node on a train.

BACKGROUND OF THE INVENTION

Wireless communication has become ubiquitous and forms the basis of many applications and services provided to the consumer of today. A particularly widespread set of wireless communication systems, colloquially known as Wi-Fi, has been developed by the Wi-Fi Alliance and is standardized in the Institute of Electrical and Electronics Engineers' (IEEE) 802.11 standards. Wi-Fi wireless communication systems are typically used to implement Wireless Local Area Networks (WLANs) in many different environments, such as in homes, workplaces, or public areas.

Wi-Fi systems provide many functions, features and services suitable for efficient implementation of WLANs and data communication. The IEEE 802.11 standards have been, and are being, developed to provide an increasing number of functions, services and benefits. The initial versions of the IEEE 802.11 standards were based on radio communication in the 2.4 GHz band, but this has been enhanced to also include the 5 GHz band. One variant is known as IEEE 802.11ad and this further expands the standard to support communications in the 60 GHz band.

A particularly difficult challenge for a communication infrastructure is to support mobility. In particular, it is difficult to provide high data rate support for fast moving vehicles, for example in order to support high capacity Internet access on board trains.

Conventional Wi-Fi systems allow handovers between different access points and accordingly provide some mobility support. However, the handovers and general mobility support tend to be relatively slow (with an interruption in data connectivity) and relatively complex and tend to not be suitable for faster moving mobile stations, such as fast-moving vehicles. Traditional Wi-Fi access points also tend to be limited to a relatively low capacity/throughput.

Another approach is to use cellular communication systems that are inherently developed to support mobility. However, such systems tend to have large cells and to be restricted to much lower capacity and throughput speed than desired.

A general problem is that in order to support high capacity communication with, in particular, a fast-moving vehicle, a significant amount of air interface resource (spectrum) is required, and this tends to restrict the capacity that can be provided by many existing systems in the most frequently used frequency ranges. This in particular applies to both cellular and Wi-Fi based wireless communication systems. It is therefore desirable to exploit less used frequency bands and there is substantial interest in providing high capacity support of fast-moving vehicles using millimeter-wave (mm) wavelength-based communication, such as specifically the 60 GHz frequency band. However, the mobility challenges known from e.g. Wi-Fi systems become even more significant. For example, for 60 GHz communications, the radio communication link is directional and heavily dependent on the specific current conditions, such as distance, line of sight, etc. For a fast-moving vehicle this results in an increased number of handovers and in continuously fast changing conditions. Whilst some direction changes can be accommodated by steering the antennae of the radio communication link, there is not the omnidirectional capability of typical cellular and Wi-Fi radios.

In general, the efficient usage of air interface in mm wave communication and with potentially fast-moving vehicles is a difficult challenge. This challenge is further exacerbated by the desire to provide this function in communication systems that are compatible with many existing network techniques and principles, such as Internet Protocol based routing, existing network-based mobility functions etc. A particular challenge is how to handle handovers in terms of updating the network operation and data routing as air interface links change.

The issue is further complicated by the fixed network supporting vehicle-based communication in many situations being segmented into separate network segments covering different areas. In such systems seamless support for a moving vehicle may often require efficient and seamless handovers between different and substantially independent network segments. For example, a train may often travel a route of several hundred kilometers, and this may typically result in it moving through a plurality of fixed networks segments operated and managed by different network operators and administrators. For example, different network segments may be handled by different Internet Service Providers. Such systems not only efficient handover between closely interconnected and cooperating access points but also between access points that are operated substantially independently of each other. This significantly complicates routing, control, adaptation, and network management in order to efficiently support vehicle-based communication.

This is particularly critical for mm wave radio communication in support of, in particular, fast moving vehicles as such systems typically require very frequent handovers in a fast-changing radio environment. Conventional approaches tend to result in inefficient and/or unreliable communication. In particular, data interruptions, reduced data rates, increased data loss, etc. are often encountered.

Hence, an improved approach for supporting communication with moving vehicles via mm wave radio communication links would be advantageous. In particular, an approach that allows improved operation, improved reliability, increased flexibility, facilitated implementation, facilitated operation, improved resource utilization, improved performance, improved handover performance, reduced data loss, and/or facilitated operation would be advantageous.

SUMMARY OF THE INVENTION

Accordingly, the Invention seeks to preferably mitigate, alleviate or eliminate one or more of the above-mentioned disadvantages singly or in any combination.

According to an aspect of the invention, there is provided, an apparatus for a communication system for supporting communication between at least one end node of a vehicle and at least one remote correspondent node via a fixed network comprising a plurality of network segments, the apparatus comprising: a plurality of wireless modems, each wireless modem being arranged to establish a mm wave radio communication link to an access point of a plurality of wireless access points of the fixed network, each wireless access point having a directional antenna arrangement for mm wave radio communication using directional beams, each wireless modem being located on the vehicle and employing an electronically steerable beamforming directional antenna having a main beam for establishing the mm wave radio communication link; a plurality of segment multipath controllers located on the vehicle, each multipath segment controller having multipath connections coupled to the plurality of wireless modems for multipath communication with a complementary segment multipath controller of a network segment of the fixed network, the network segment being different for different segment multipath controllers of the plurality of segment multipath controllers, and a root multipath controller located on the vehicle and having multipath connections coupled to the plurality of segment multipath controllers and being arranged to perform multipath communication with a complementary root multipath controller of the fixed network.

According to an aspect of the invention, there is provided, fixed network for a communication system supporting communication between at least one end node of a vehicle and at least one remote correspondent node via the fixed network, the fixed network comprising a plurality of network segments and a plurality of access points, each access point being arranged to establish a mm wave radio communication link to a wireless modem of a plurality of wireless modems of the vehicle and each wireless access point employing a beamforming directional antenna having a main beam for establishing the mm wave radio communication link, at least one access point of the plurality of access points being able to establish mm wave radio communication links to a plurality of wireless modems using different main beams and being arranged to select between the different main beams for a data packet in dependence on a network address of the data packet; a plurality of segment multipath controllers, each multipath segment controller having multipath connections coupled to at least some access points of a network segment of the plurality of network segments for multipath communication with a complementary segment multipath controller of the vehicle, the network segment for a segment multipath controller being different for different segment multipath controllers of the plurality of segment multipath controllers; and a root multipath controller having multipath connections coupled to the plurality of segment multipath controllers and being arranged to perform multipath communication with a complementary root multipath controller of the vehicle.

According to an aspect of the invention, there is provided a communication system comprising an apparatus and a fixed network as described above.

The invention may provide improved and/or facilitated operation and/or improved performance for a beamform based mm wave radio communication system supporting (potentially fast) moving vehicles and employing a segmented fixed network. The approach may in particular provide efficient and reliable communication.

The approach may provide improved consistency and reduced data interruption and/or performance degradation, due to handovers between different parts of the fixed network.

The approach may allow an efficient, high performance, and quick adaptation to changes in access points and network segments supporting communication for the vehicle.

The use of beams from directional antennas may specifically support radio communication links from different wireless modems of the vehicle to the same access point or to different access points. It may allow steering of the beams towards the same or different access points thereby enabling or improving multiple links between the vehicle and access points. This may provide improved performance.

The wireless modems, root multipath controller, segment multipath controllers, and/or end node may be in/on/attached to/move with etc. the vehicle, and may be part of a mobile network that moves with the vehicle.

A complementary multipath controller is an interworking/cooperating multipath controller. A multipath controller and complementary multipath controller may form a single external path for data communication while implementing multiple parallel paths for the data communication between the multipath controller and the complementary multipath controller. A multipath controller may provide a single connection point for a data communication being performed over a plurality of paths between the multipath controller and the complementary multipath controller.

According to an optional feature of the invention, the root multipath controller and the plurality of segment multipath controllers are arranged to communicate a combined data flow for a plurality of end nodes of the vehicle.

According to an optional feature of the invention, at least a first segment multipath controller of the plurality of segment multipath controllers is arranged to allocate data to paths of the plurality of wireless modems in response to a radio link condition indication for at least one mm wave radio communication link.

According to an optional feature of the invention, the mm wave radio communication link includes at least one of: a radio signal strength indication; a throughput indication; an error rate indication; and a signal to noise ratio indication.

According to an optional feature of the invention, at least a first segment multipath controller of the plurality of segment multipath controllers is arranged to address data packets from a first wireless modem to a first complementary segment multipath controller using a first network address selected from a stored list of predetermined network addresses for the plurality of complementary segment multipath controllers, a selection of the first network address being based on an access point identity for an access point communicating with the first wireless modem.

According to an optional feature of the invention, the root multipath controller is coupled to the plurality of segment multipath controllers via a Layer 3 routed network section.

According to an optional feature of the invention, at least one segment multipath controller is coupled to the at least some access points via a Layer 2 switched network section.

According to an optional feature of the invention, the root multipath controller is arranged to communicate data with the complementary root multipath controller using data packet tunneling, each of at least some subflows between the root multipath controller and the complementary root multipath controller being a data packet tunnel.

According to an optional feature of the invention, the data packet tunneling utilizes UDP data packets.

According to an optional feature of the invention, at least one segment multipath controller of the plurality of segment multipath controllers is arranged to communicate data with a complementary segment multipath controller using data packet tunneling, each of at least some subflows between the at least one segment multipath controller and the complementary segment multipath controller being a data packet tunnel.

According to an optional feature of the invention, the tunneling utilizes UDP data packets.

According to an optional feature of the invention, the root multipath controller is not arranged to allocate data to paths of the plurality of segment multipath controllers in response to a radio link condition indication for any mm wave radio communication link.

According to an optional feature of the invention, the root multipath controller is arranged to allocate data to paths of the plurality of segment multipath controllers in response to transport layer properties for the paths.

According to an optional feature of the invention, the root multipath controller is arranged to allocate data to paths of the plurality of segment multipath controllers independently of allocation of data to paths of the at least some access points by the plurality of segment multipath controllers.

According to an optional feature of the invention, each network segment comprises at least one gateway and communication across a segment edge is via the at least one gateway.

According to an optional feature of the invention, the gateways are Internet gateways.

According to an optional feature of the invention, each network segment of the plurality of network segments has a different subnet IP address range.

According to an optional feature of the invention, latency for communication within each network segment of the plurality of network segments is lower than latency for communication between network segments of the plurality of network segments.

According to an optional feature of the invention, the root multipath controller is arranged to process data for the vehicle only for a subset of service classes out of a plurality of service classes supported by the fixed network.

According to an aspect of the invention, there is provided a method of operation for a communication system for supporting communication between at least one end node of a vehicle and at least one remote correspondent node via a fixed network comprising a plurality of network segments, the communication system comprising: a plurality of wireless modems, each wireless modem being arranged to establish a mm wave radio communication link to an access point of a plurality of wireless access points of the fixed network, each wireless access point having a directional antenna arrangement for mm wave radio communication using directional beams, each wireless modem being located on the vehicle and employing an electronically steerable beam-forming directional antenna having a main beam for establishing the first mm wave radio communication link; a plurality of segment multipath controllers located on the vehicle, each multipath segment controller having multipath connections coupled to the plurality of wireless modems for the network segment being different for different segment multipath controllers of the plurality of segment multipath controllers, and a root multipath controller located on the vehicle and having multipath connections coupled to the plurality of segment multipath controllers; the method comprising: the plurality of segment multipath controllers performing multipath communication with a complementary segment multipath controller of a network segment of the fixed network; and the root multipath controller performing multipath communication with a complementary root multipath controller of the fixed network.

According to an aspect of the invention, there is provided, method of operation for a fixed network for a communication system supporting communication between at least one end node of a vehicle and at least one remote correspondent node via the fixed network, the fixed network comprising a plurality of network segments and: a plurality of access points, each access point being arranged to establish a mm wave radio communication link to a wireless modem of a plurality of wireless modems of the vehicle and each wireless access point employing a beamforming directional antenna having a main beam for establishing the first mm wave radio communication link, at least one access point of the plurality of access points being able to establish mm wave radio communication links to a plurality of wireless modems using different main beams and being arranged to select between the different main beams for a data packet in dependence on a network address of the data packet; a plurality of segment multipath controllers, each multipath segment controller having multipath connections coupled to at least some access points of a network segment of the plurality of network segments, the network segment for a segment multipath controller being different for different segment multipath controllers of the plurality of segment multipath controllers; and a root multipath controller having multipath connections coupled to the plurality of segment multipath controllers; the method comprising: the plurality of segment multipath controllers performing multipath communication with a complementary segment multipath controller of the vehicle; and the root multipath controller performing multipath communication with a complementary root multipath controller of the vehicle.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which

FIG. 12 illustrates an example of elements of a multipath controller arrangement.

DETAILED DESCRIPTION OF SOME EMBODIMENTS OF THE INVENTION

Figure 1:
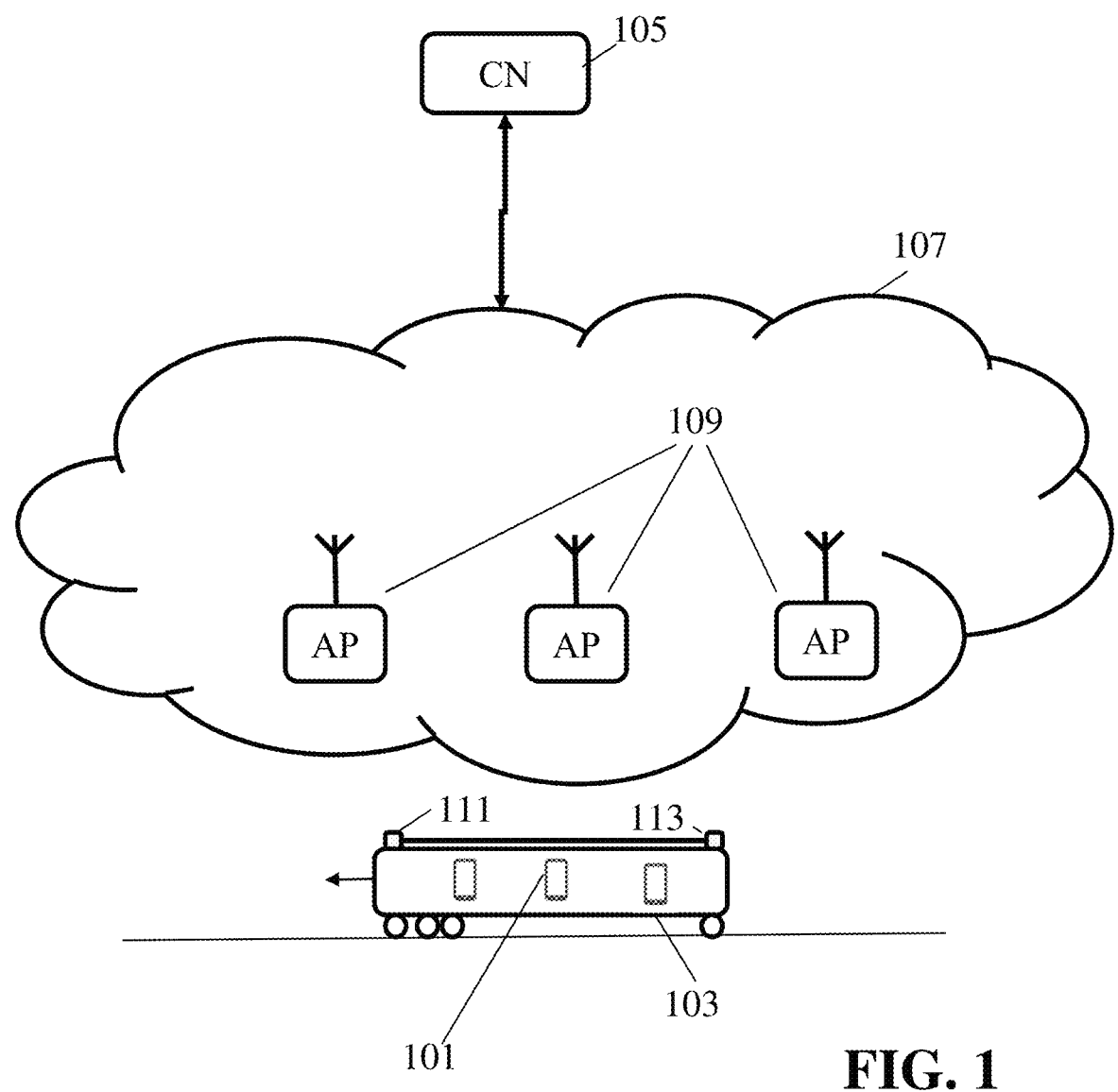
FIG. 1 illustrates an example of elements of a wireless communication system in accordance with some embodiments of the invention.

FIG. 1 illustrates an example of elements of a communication system which supports communication with end nodes that are located in moving vehicles, and in particular in fast moving vehicles such as cars, boats, buses, and trains. The following description will focus on an example in which the vehicle is a train, but it will be appreciated that in other embodiments the end node may be part of other vehicles, such as e.g. a bus driving on a motorway.

In the example of FIG. 1, a communication/data session is established between a correspondent node 105 and an end node 101 located in a train/vehicle 103. It will be appreciated that references to an entity being at/with/in/on etc. a vehicle includes any physical or logical form of the vehicle and entity being substantially co-moving, including the entity being positioned on, attached to, embedded within, etc. the vehicle. It will also be appreciated that it does not require the entity to be immovable with respect to the vehicle but rather it may include, for example, an entity being manually moved by a person (such as a person carrying a mobile device comprising the end node 101). An entity being in a vehicle may include all scenarios wherein the movement of the entity is at least partially dependent on the movement of the vehicle/where the movement of the vehicle imparts a movement on the entity.

The correspondent node 105 may be any communication node/service, and indeed may itself be a mobile node, or a node located in a vehicle. The following description will consider a scenario wherein the correspondent node 105 is a server supporting a corresponding client operating on the end node 101, and specifically a World Wide Web application will be considered where the correspondent node 105 is a web server supporting a web browser on the end node 101 accessing an Internet site supported by the web server of the corresponding node 105.

The communication/data session is supported by a fixed network 107 which may specifically be a complex network comprising routers, switches, management nodes, mobility controllers, modems etc. as will be known to the skilled person. In the example, the fixed network 107 is a Wide Area Network, WAN, based on the Internet Protocol (IP).

The correspondent node 105 is coupled to the fixed network 107 through a communication connection which supports the data session with the end node 101. The communication connection is in the example an IP connection and may be established using any suitable means, such as e.g. by a direct connection of a device comprising the corresponding node 105 to a node of the fixed network or e.g. it may be a connection which is provided by a network coupled to both the fixed network 107 and the corresponding node 105. The network may in particular be the Internet, and the coupling of the correspondent node 105 to the fixed network 107 may be via an Internet connection. It will also be appreciated that the fixed network 107 itself may be considered fully or partially part of the Internet and/or that the Internet may form part of the fixed network 107.

It will be appreciated that although FIG. 1 (and the following) figures focusses on description of communication for one end node, the system will typically support simultaneous communication for a large number of end nodes and in many embodiments, the combined data rate for communication to/from the vehicle may be in the order of several tens or even hundreds of Gigabit per second.

The coupling of the fixed network 107 to nodes on the train 103 is supported by wireless radio communication links. For this purpose, the fixed network 107 comprises a plurality of wireless access points (APs) 109 which in the specific example may be a relatively large number of stationary access points e.g. positioned along train tracks to support communication for a train.

Correspondingly, the train/vehicle 103 comprises a plurality of wireless modems 111, 113 which are arranged to establish wireless (radio) communication links with the access points 109. The wireless modems 111, 113 are further arranged to establish one or more connections with the end node 101. The wireless modems 111, 113 are accordingly located at (in/on etc.) the train and are arranged to communicate with the access points 109 in order to provide an interface between the vehicle network nodes and entities (and specifically the end node 101) and the fixed network 107.

In the specific embodiment, the wireless radio links between the wireless modems 111, 113 and the access points 109 are formed using relatively high radio frequencies, and specifically mm wave radio communication is used. For example, the wireless links may be formed by radio communications using the 60 GHz frequency band. mm wave communications may specifically be communication in the 20 GHz to 300 GHz frequency range.

The wireless modems 111, 113 are individual nodes in the network configuration and have individual MAC addresses. Data packets can be addressed to the individual modems by other network entities, such as routers or switches, using the individual MAC addresses. A communication link is established from an access point 109 to a wireless modem 111 using the MAC addresses of the AP 109 and the modem 111, and similarly for a link to modem 113 but using the MAC address of modem 113.

In the specific embodiment of using the IEEE 802.11ad wireless technology, the AP and the two modems would form a BSS (basic service set). A scheduler may accordingly allocate data packets to an individual link by associating them with the appropriate MAC address. In particular, each AP may comprise a MAC layer scheduler which performs scheduling of data over the air interface of the AP based on MAC addresses. In many systems, such as those based on IEEE 802.11 standards, the scheduling is based on a TDMA scheduling allocating time slots for individual air interface links.

Radio communications at higher frequencies tend to be more suited for shorter distances and using direct line of sight propagation. Directional beams are employed to increase the link distance, but the maximum distance for the wireless links tends to be relatively limited and each access point 109 will typically only cover a relatively short distance or interval. For example, for a 60 GHz system supporting a train, the coverage from each access points 109 may practically be restricted to e.g. around 300 m to 1 km from the access points 109. Accordingly, the distance between access points 109 will tend to be relatively small with the result that a relatively large number of access points 109 will be employed. For example, along a railway track, access points may be distributed for each, e.g. 500 m-1 km of track.

As a consequence, the radio conditions will tend to change quickly for the wireless modems 111, 113, and specifically the optimum access points 109 to which to connect tend to change quickly, e.g. for a train moving along train tracks at a potentially high speed. Furthermore, the directional radio beam of the wireless modems 111, 113 cannot necessarily be steered over all directions, but may be limited to e.g. a 90-degree range in the horizontal (azimuth) plane. In order to support such scenarios, the system supports handovers between different access points 109 such that a connection from an end node 101 to the fixed network 107 (and the correspondent node 105) can be sequentially supported by different access points 109 and modems 111, 113 as the vehicle/train 103 moves. In order to maximize the separation of the access points, an individual modem can lose connectivity for significant periods of time (for example, it may only be connected to an AP for approximately half of the time), but the connectivity to the vehicle from at least one modem at any one point in time can be maintained.

It is desirable for such handovers to be seamless to the end node 101 such that the communication and the supported service is not interrupted. It is specifically desirable to establish new access point connections before terminating the previous ones (also known as make before break handovers).

However, supporting mobile communications, and, in particular, in situations where the wireless scenario experienced by the mobile unit changes quickly requiring many and frequent handovers, is a very difficult and challenging problem. The challenge tends to be exacerbated for communication systems and networks, such as IP networks, that are not originally designed to support such mobility.

The system of FIG. 1 is arranged to provide efficient and high-performance mobility support for end nodes of a vehicle, such as specifically for end nodes that are comprised in e.g. handheld devices of passengers on a fast-moving train.

Figure 2:
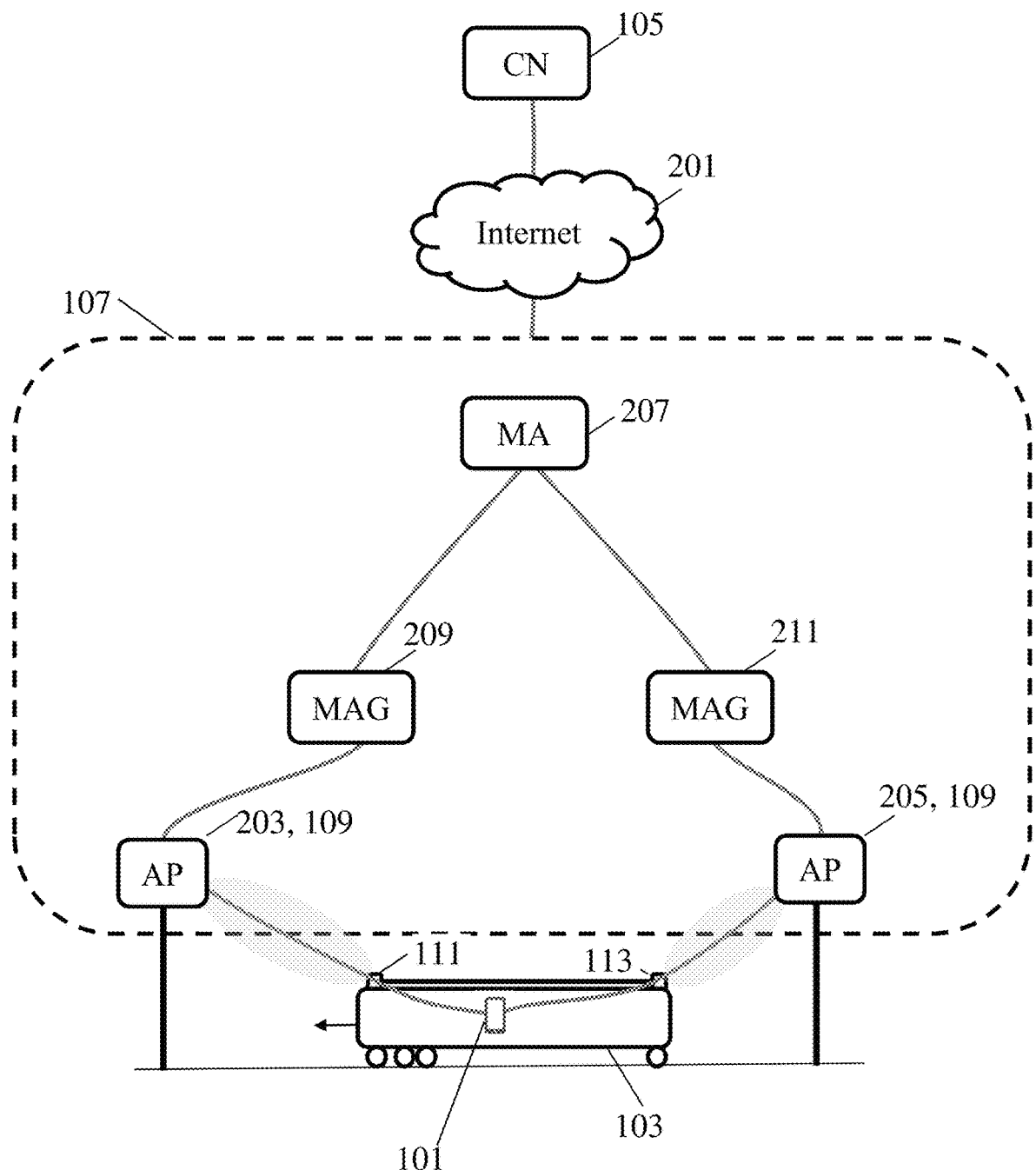
FIG. 2 illustrates an example of elements of a wireless communication system in accordance with some embodiments of the invention.

FIG. 2 which shows an example of a specific scenario of FIG. 1 in which an end node 101 in a train 103 communicates with a correspondent node 105.

In the specific example, the correspondent node 105 is coupled to the fixed network 107 via a connection of the Internet 201 (it will be appreciated that the fixed network 107, as indeed the wireless modems 111, 113, may be considered fully or partially part of the Internet).

FIG. 2 illustrates a specific situation in which the train 103 has simultaneous access to a first access point 203 and a second access point 205 of the access points 109 via a pair of wireless modems of the wireless modems 111, 113. In the specific situation, one wireless modem 111 has established a wireless link with the first access point 203 and another wireless modem 113 has established a wireless link with the second access point 205.

The end node 101 and corresponding node 101 have established a data session which is supported by the fixed network 107. For example, the correspondent node 105 may operate a web server providing a web service to a client running on a device implementing the end node 101. As a specific example, a passenger on the train may operate a web browsing application which operates a web browsing client that initiates and supports a web service provided by the correspondent node 105.

The fixed network 107 provides connections that can be used by the client and the server. In order to support the mobility of the fast-moving train, the fixed network 107 may in some examples comprise a mobility anchor (MA) 207 which operates as a fixed anchor for the mobile nodes of the train 103. Specifically, the mobility anchor 207 operates as a common fixed anchor in the fixed network 107 for all the wireless modems 111, 113 of the train 103.

The mobility anchor 207 may provide a common node for all connections and communication paths from the correspondent node 105 to the end node 101 regardless of which of the access points 109 and wireless modems 111, 113 support the communication.

Accordingly, all data from the correspondent node 105 to the end node 101 for the data session may be routed via the mobility anchor 207 regardless of the wireless link that is used on the air interface between the access points 109 and the train. This may for example be achieved by the mobility anchor 207 advertising that it is a mobility anchor 207 for the wireless modems 111, 113 (or other nodes on the train 103) such that any datagrams addressed to any of these nodes will be routed to the mobility anchor 207.

Similarly, all data from the end node 101 to the correspondent node 105 for the data session may be routed via the mobility anchor 207 regardless of the wireless link that is used on the air interface between the access points 109 and the train 103.

The system may accordingly operate a mobility anchor functionality which provides a fixed anchor point for the mobile nodes of the train 103. The mobility anchor 207 will perform mobility management which includes keeping track of which access points 109 the wireless modems 111, 113 are currently connected to, and updating the routing path for the individual wireless modems 111, 113 and the end node 101 when conditions change. Thus, when the train moves and the individual modems dynamically switch/handover to different access points 109, the mobility anchor 207 will register the resulting changes and update the communication path for the individual connection/flow.

In the example of FIG. 2, each of the access points 203, 205 is coupled to a Mobile Access Gateway 209, 211. Each Mobile Access Gateway 209, 211 is typically linked with a plurality but not all of the access points 203, 205. Indeed, each MAG 209, 211 may be associated with a different segment of the network.

The mobility anchor 207 is accordingly a common mobility anchor for a plurality of the wireless modems 111, 113 of the train 103, and typically for all of the wireless modems 111, 113.

In many practical systems, some or all of the access points 109 may be substantially colocated and coupled together through network entities that allow short routing paths between them.

Figure 3:
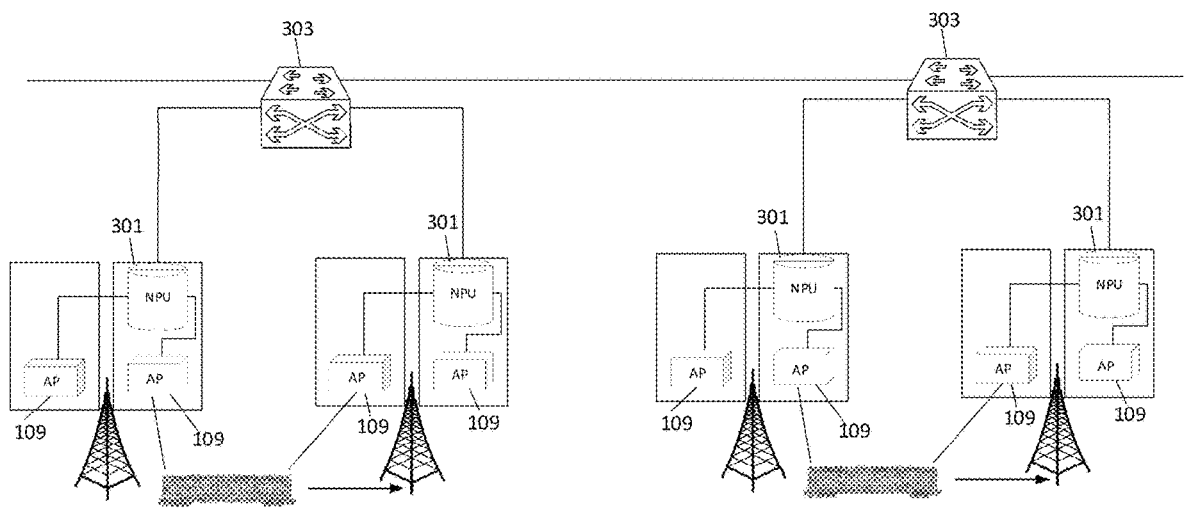
FIG. 3 illustrates an example of elements of a wireless communication system in accordance with some embodiments of the invention.

In many embodiments, such as e.g. illustrated by FIG. 3, two access points 109 may typically be colocated (e.g. on the same mast) with directional beams being used to provide coverage in different, and typically opposite directions. Thus, the access points 109 may comprise a directional antenna arrangement which forms directional beams to support the mm wave radio communications. In some embodiments, the directional antenna arrangement may be arranged to dynamically beam form and steer beams towards wireless modems on the vehicle, i.e. dynamic beam adaptation and steering may be employed. In other embodiments, the directional antenna arrangement may form static beams that are in a given, typical predetermined direction. For example, for access points next to a train track, a static beam in the direction along the track may be formed.

In many embodiments, one, more, or all of the access points is/are arranged to generate a plurality of main beams. For example, as known to the skilled person, an antenna array may be used having a plurality of antenna elements that can be individually phase/delay offset such that the combined radiation pattern forms a main beam in a given direction. Different antenna offsets can be used simultaneously for different signals to generate different directional patterns and specifically to direct main beams in different directions. In other embodiments, a plurality of directional beams may be used to generate beams in different directions.

In such systems, a plurality of mm wave radio communication links may be simultaneously established and specifically each main beam may be used to establish a mm wave radio communication link to a wireless modem 111, 113. Thus, from a single access point 109, a plurality of mm wave radio communication links may be established to different wireless modems 111, 113 using different main beams.

The access points 109 may in such embodiments to select a beam to use for a given data packet when transmitting these to the vehicle 103.

Thus, the access point 109 may be arranged to/comprise a selector for selecting between the plurality of main beams for data packets received from the fixed network and to be transmitted to a wireless modem/forwarded towards the end node. The selection of which main beam to use may be dependent on an address of the data packet to be transmitted.

Specifically, in some embodiments, a destination address may be extracted from the data packet and used to select the main beam to use. The destination address may be an address allocated to one or more nodes of the vehicle network and may specifically be an address of one of the wireless modems 111, 113.

In many embodiments, the address is specifically a MAC address, and it may specifically be a MAC address of the wireless modems.

In many embodiments, the access point 109 may maintain a list of main beams and associated network addresses, such as a list of the main beams with a linked wireless modem MAC address for each main beam. When receiving a data packet, the access point may extract the destination MAC address and compare it to the MAC addresses of the list. The matching main beam is then selected for the transmission of the data packet.

The approach allows for a high degree of flexibility and allows the system to adapt to changing conditions. The approach is highly suitable for mm wave radio communication links where beamforming is practical and where the radio conditions may change very quickly.

However, a challenge for such a system is that there is a close coordination between the network operation and the radio conditions and as these may change quickly and substantially, the handling of the network related issues (e.g. routing/switching updates) is very challenging.

The colocated access points 109 may often be coupled to each other and the rest of the fixed network 107 by a suitable network entity, such as a Network Processing Unit (NPU 301). The NPU 301 may for example allow easy routing of data from one access point to another, and may control whether data packets are routed between the end node and the fixed network via one or the other of the colocated access points 109.

Further, in many systems, the different access points 109 may be coupled together via switches or routers 303 that e.g. may provide a short and direct routing between access points 109 and NPUs 301. This may often facilitate routing and handovers when the vehicle moves as the required modification of routing can be reduced and localized to a higher degree. The switches or routers 303 may further connect to the rest of the fixed networks, e.g. through interface routers/switches 305.

It will be appreciated that many other network configurations are possible, e.g. a centralized switch arrangement with a wired hub and spoke arrangement to each access point may be used in some embodiments.

Figure 4:
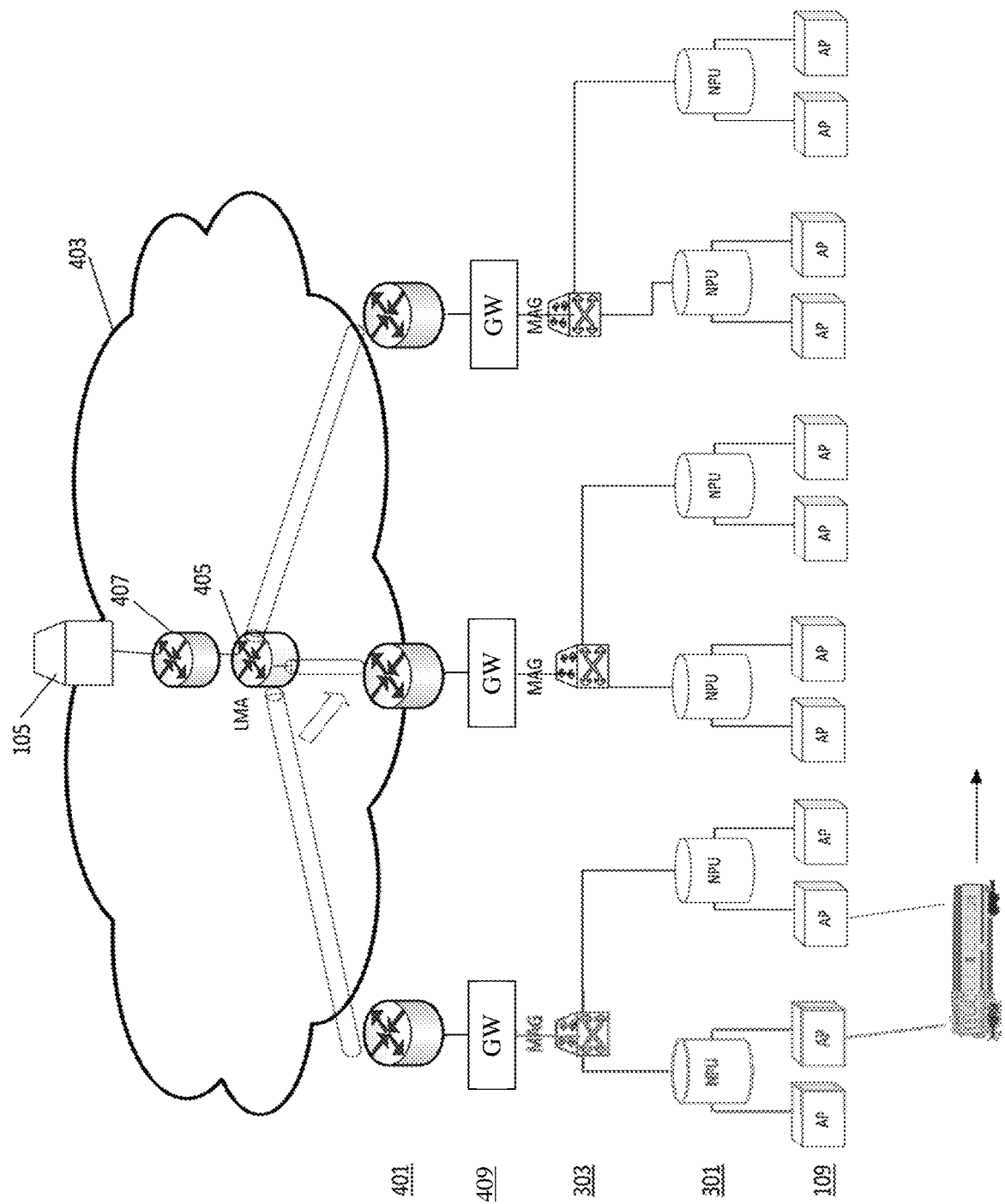
FIG. 4 illustrates an example of elements of a wireless communication system in accordance with some embodiments of the invention.

FIG. 4 illustrates a specific example of a possible network where pairs of access points 109 are colocated and supported by an NPU 301. A plurality of NPUs 301 may be coupled to a network switch 303 which may provide the MAG for that plurality of NPUs 301. Other network switches may support other access points 109 and provide a MAG for those access points 109.

In many embodiments, such a system of access points 109 and supporting network functions (e.g. switches and NPUs) may be proprietary and aimed at a specific scenario, such as supporting a train along a track. Such a proprietary system may accordingly provide a number of interface points with capability of providing a MAG function for the moving vehicle. The system may for example provide a proprietary access network that may be coupled to other networks via suitable interface connections and gateways.

For example, each of the interface points may be coupled to an edge router 401 of a core network 403 being part of the fixed network 107. The core network 403 may be a general non-proprietary network such as e.g. the Internet. In some embodiments, the MAG function may be provided in the edge router (or possibly another element of the core network). Another router 405 of the core network 403 may provide a MA (Mobility Anchor) function allowing routing of data to and from the MAG as appropriate. The correspondent node 105 may communicate with the MA through a suitable route, typically including a number of routers 407.

In such a system, the fixed network 107 may comprise a plurality of network segments that are coupled together via a core network 403. Each of the network segments may provide one or more gateway nodes 409 to the core network 403 such that data communication traversing the border between the core network 403 and a network segment is via a gateway node 409 for that segment. In many embodiments, the core network 403 is the Internet and thus all communication between the Internet and the individual segment is via an Internet gateway node for the segment.

The gateway node 409 may for some segments be a separate node that performs e.g. a network bridge function between the network segment and the core network 403. The gateway node 409 may in some systems/segments be coupled/connected directly to an edge router 401 of the core network or may indeed in some embodiments be integrated with such an edge router 401.

In some embodiments, the gateway node 409 may also provide a routing function for the network segment and may specifically be integrated with a network segment router or switch.

The segmented network accordingly comprises a plurality of network segments. Communication into or out of a segment is via a gateway node 409. All data traversing a segment border is via a gateway node 409 and thus communication between two segments is typically via two gateway nodes for the two segments.

In some embodiments, gateway nodes between segments may be directly connected or indeed may be a common node e.g. providing a network bridge function. However, in most embodiments, segment gateway nodes of different segments are coupled via a core network 403. In some embodiments, network segments may be connected directly to each user using a network bridge function.

In many embodiments, the core network 403 may indeed be the Internet and communication between different segments is via the Internet. Thus, each segment may provide at least one Internet gateway and communication in and out of the segment may be via the Internet gateways(s).

In the system all routing of data packets to or from a network segment is accordingly via a gateway node 409. However, routing within a network segment may be more flexible and more provide efficient routing updating etc.

In some embodiments, segments may be differentiated by the global addressing, such as e.g. where a subset of the global addressing may correspond to a network segment. For example, ARP functions/operations may be limited to a single network segment and ARP operations may not cross network segment edges.

Each segment is typically a different subnet having a different subnet IP address range. Specifically, the subnet mask may be different for different network segments. Thus, all IP addresses within a given segment fall within a given IP subnet mask but with the subnet masks for different networks being different.

Routing within a segment accordingly tends to be flexible, short (relatively few hubs), fast, and adaptive whereas routing between segments or between the segments and the core network 403, tends to be inflexible, involve more hobs, be slower, and be less adaptable. Routing between nodes within a segment has a relative low latency (and specifically maximum/guaranteed delay) whereas routing between segments has higher latency (and specifically maximum/guaranteed delay). In many embodiments, a maximum delay/latency for routing a data packet may be less than 100 msec whereas a maximum delay/latency for routing a data packet between segments is not less than 100 msec.

The different network segments may often be proprietary networks that are managed/operated/controlled/implemented by different entities/operators, and indeed different entities/operators than the core network/Internet. For example, to provide network support for a train travelling a long distance, including potentially between different countries, it is often practical to cover the distance using different networks that are coupled together, e.g. via the Internet, to provide consistent coverage and support. These individually operated networks thus perform different and independent network segments of the overall fixed network supporting the train for the entire route.

Typically the network segments may be proprietary access networks whereas the core network is often a non-proprietary network Different functions may be implemented in the individual segments. For example, different, and independent, mobility functions and mobility support may be implemented in different segments.

Specifically, the mobility support may be implemented at different network layers and using different protocols. For example, intra MAG mobility within one segment may be implemented using Layer 2 (L2) signaling such as L2 ARP (Data Link Layer-Address Resolution Protocol). This may provide fast and efficient handover between access points 109 within the same segment and under the same MAG, and specifically may allow handovers without requiring any change of routing in the core network.

Thus, the segments may be a layer 2 network in which routing is based on MAC addresses.

In contrast, inter segment, and typically inter MAG mobility, may be supported by a higher layer protocol, i.e. a layer 3 (L3) or above protocol, such as for example an IP protocol. Specifically, inter segment communication via the core network may be based on the IP protocol, and the core network may be an IP network. The routing of data packets in the core network may include IP address routing.

Figure 5:
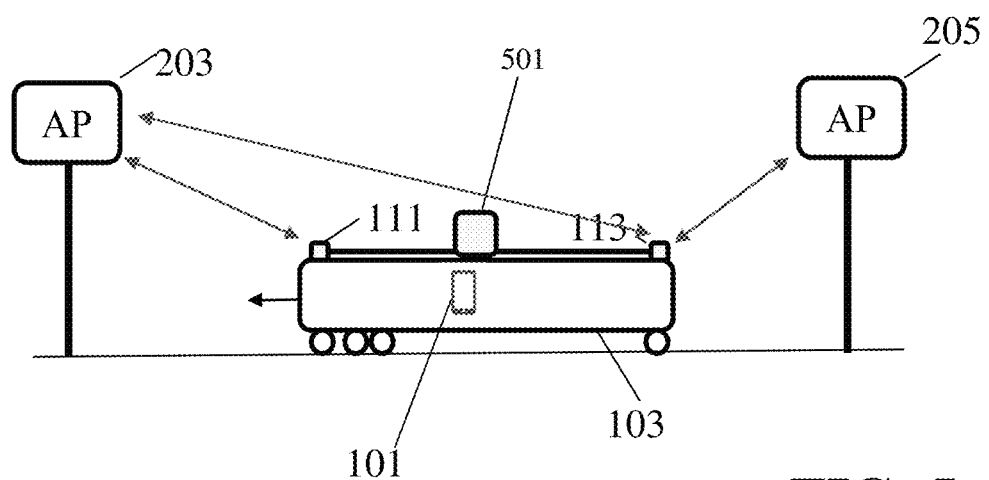
FIG. 5 illustrates an example of elements of a wireless communication system in accordance with some embodiments of the invention.

In some embodiments, the end node 101 may directly be connected to the wireless modems 111, 113 e.g. by a direct wireless link. However, in many embodiments, the wireless modems 111, 113 may as illustrated in FIG. 5 be coupled to a network element 501 or a network through which the connection with the end node 101 is formed. Thus, the wireless modems 111, 113 may be part of a vehicle network that supports communication for end nodes. The network may for example include IEEE 802.11 network elements and access points for the end nodes.

Figure 6:
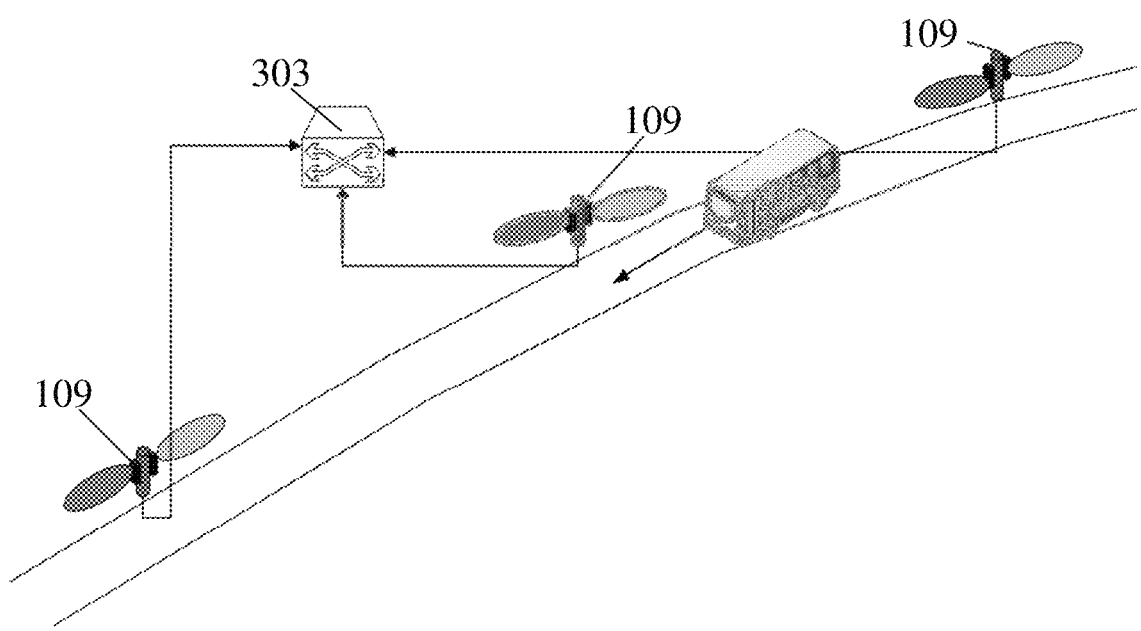
FIG. 6 illustrates an example of elements of a wireless communication system in accordance with some embodiments of the invention.

As previously mentioned, in many systems, the access points 109 may be arranged with a plurality of access points 109 being substantially colocated. For example, often pairs of access points 109 are colocated on a mast along the route covered. The access points 109 may use directional antenna arrangements to provide different coverage areas. For example, as illustrated in FIG. 6, two colocated access points 109 may have directional antenna beams that are substantially in opposite directions, and typically in different directions along the track being covered (e.g. in opposite directions of the track or road being covered).

Thus, some or all of the access points 109 may comprise directional antennas which are arranged to steer beams towards the wireless modems of the vehicle. In some embodiments, a static beam forming may be used with the beam formed being constant in a given direction. For example, one access point 109 may permanently direct a beam down a track and another colocated access point 109 may permanently direct a beam up the track in the other direction. A vehicle downstream from the position may then be connected via a wireless link with the first access point 109 and a vehicle upstream from the position may then be connected via a wireless link with the second access point 109.

In many embodiments, the access points 109 may be arranged to dynamically and electronically steer the beams, and specifically may be arranged to steer them towards respectively the wireless modems. A beam may indeed by steered individually for each wireless link and may dynamically be updated to be directed towards the wireless modem supporting the link. The updating may for example be by updating antenna array coefficients in response to received parameters as well known in the art.

In the examples previously described, two wireless modems 111, 113 were used to establish links between the vehicle/train 103 and the fixed network 107. The two wireless modems 111, 113 are in the examples positioned towards opposite ends of the vehicle/train 103. In some embodiments, the vehicle/train 103 may comprise more wireless modems and in particular it may in many embodiments be advantageous to have a plurality colocated wireless modems. This may specifically be advantageous if the colocated modems are arranged to form beams in different directions and/or freely/separately/independently of each other.

In particular, in many embodiments, rather than having a single wireless modem towards the front of the vehicle/train, there may be two wireless modems forming beams respectively in the forwards and in the backwards direction. Similarly, rather than having a single wireless modem towards the back of the vehicle/train, there may be two wireless modems forming beams respectively in the forwards and in the backwards direction. Thus, in such an example, there may be four links available such as e.g. often two links from respectively the front and the back of the vehicle/train pointing towards an access point ahead of the vehicle/train and two links from respectively the front and the back of the vehicle/train pointing towards an access point behind the vehicle/train. In some systems, there may be implemented a scheduling function which freely and dynamically can allocate data over the four different air interface links thereby allowing these to be fully optimized.

Figure 7:
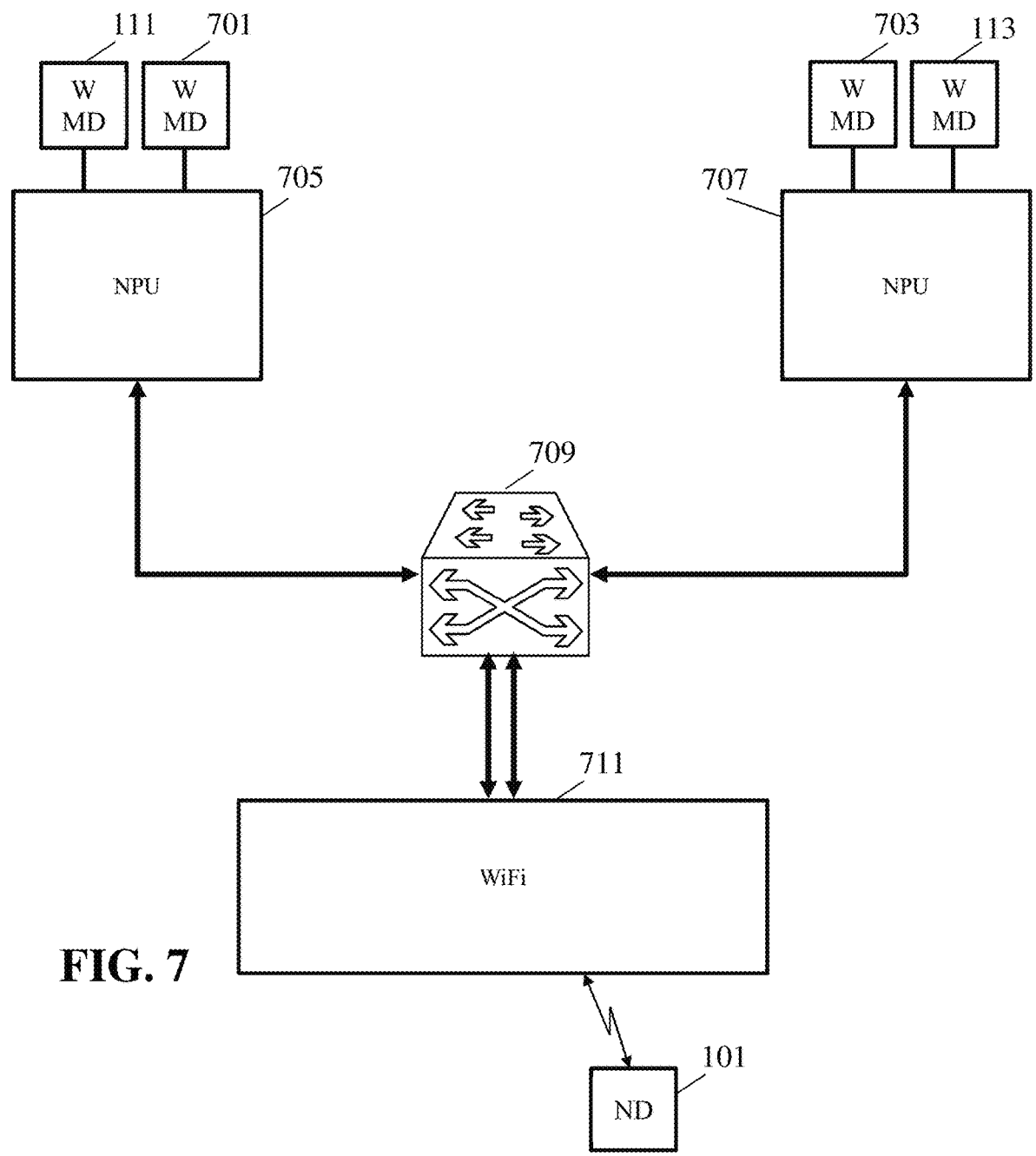
FIG. 7 illustrates an example of elements of a vehicle-based network subsystem of a wireless communication system in accordance with some embodiments of the invention.

FIG. 7 illustrates an example where a moving vehicle may comprise four wireless modems 111, 113, 701, 703 being arranged into colocated pairs with one pair of colocated wireless modems 111, 701 being towards the front of the vehicle and the other pair of colocated wireless modems 113, 703 being located towards the rear of the vehicle.

The first pair of wireless modems 111, 701 are coupled to a first NPU 705 and the second pair of wireless modems 113, 703 are coupled to a second NPU 707. The NPUs 705, 707 are coupled to a switch 709 which is further coupled to a Wi-Fi subsystem 711. The NPUs 705, 707 and WiFi subsystem 711 may specifically be coupled to the switch 709 via Ethernet connections and the switch 709 may be an Ethernet switch. The WiFi subsystem 711 may e.g. provide wireless WiFi access throughout the vehicle, such as throughout a train, and may itself comprise WiFi access points, routers etc. Thus, a user of the end node 101 may simply connect to a local WiFi subsystem 711 (and specifically a conventional WiFi access point) to access the core network and the correspondent node 105. The WiFi subsystem 711 may for example be a conventional WiFi system such as an IEEE 802ac (or earlier) system. Thus, a user on a moving vehicle, such as a train, may simply access a conventional local WiFi access point to gain Internet access.

In the system described, the wireless modems employ electronically steerable beamforming directional antenna that form a beam, and more specifically that form a directional pattern having a main beam that can be steered. Further, in the example two colocated wireless modems may employ directional antennas that may form a beam in different directions, such as e.g. in a forward direction or range of directions and a backwards direction or range of directions respectively.

E.g., in the example of FIG. 7, the two co-located wireless modems 111, 701 may employ electronically steerable beamforming directional antennas that are directed in substantially opposite directions, specifically in the direction of movement and in the opposite direction of movement, specifically one directional antenna may be directed in the forwards direction of the vehicle and the other being pointed in the backwards direction of movement.

Similarly, the other two co-located modems 113, 703 may employ directional antennas that are also directed in opposite directions, specifically in the direction of movement and in the opposite direction (forward/backwards). This may result in two wireless modems 111, 703 having beams formed generally in the forward direction (direction of movement) and two modems 113, 701 having beams formed generally in the backward direction.

Thus, the different pairs/sets of colocated wireless modems may each comprise a wireless modem arranged to form a beam in substantially the same direction as a wireless modem of another pair/set of colocated wireless modems.

In many embodiments, the wireless modems may comprise a beam adapter which is arranged to adaptively steer the main beam of the electronically steerable beamforming directional antenna towards the access point. It will be appreciated that many different approaches and algorithms are known for steering a beam towards a desired transmitter and/or receiver and that any suitable approach may be used.

For example, the wireless modems may comprise an electronically steerable beamforming directional antenna in the form of an antenna array for forming a main directional beam and the wireless modems may comprise a beam adapter which dynamically is arranged to adapt the individual antenna coefficients to direct the main beam towards the relevant access points, e.g. by applying a beam steering algorithm maximizing the received signal strength or signal to noise ratio as well known in the art. As another example, more mechanical solutions may be used. For example, horn antenna being electronically steerable using a stepper motor with electronic control may be used.

For two wireless modems connected to the same access point, such a steering may automatically and inherently result in the beams being formed in substantially the same direction for at least most locations. Specifically, when the distance between the wireless modems is small compared to the distance to the access point (say at least 5 or 10 times lower), the directions are inherently in substantially in the same direction. This will in most applications be the case for the majority of locations of the vehicle. The beam forming of two wireless modems towards the same point (and specifically access point) will be in substantially the same direction for a distance to the vehicle being at least 5 or 10 times greater than a distance between the wireless modems.

Thus, such an adaptive steering may not only result in improved link quality for the individual link as the beam may be dynamically optimized, but may also inherently ensure that the beams of the different wireless modems are formed in substantially the same direction, and specifically are formed towards the same access point, for most locations of the vehicle.

The wireless modems having beams pointing in the same direction may be suitable for forming wireless links with the same access point 109. For example, the two wireless modems having beams pointing in the forwards direction may both be suitable for establishing a wireless link with an access point 109 further ahead along the route/track. Similarly, the two wireless modems having beams pointing in the backwards direction may both be suitable for establishing a wireless link with an access point 109 being further backwards along the tracks.

Figure 8:
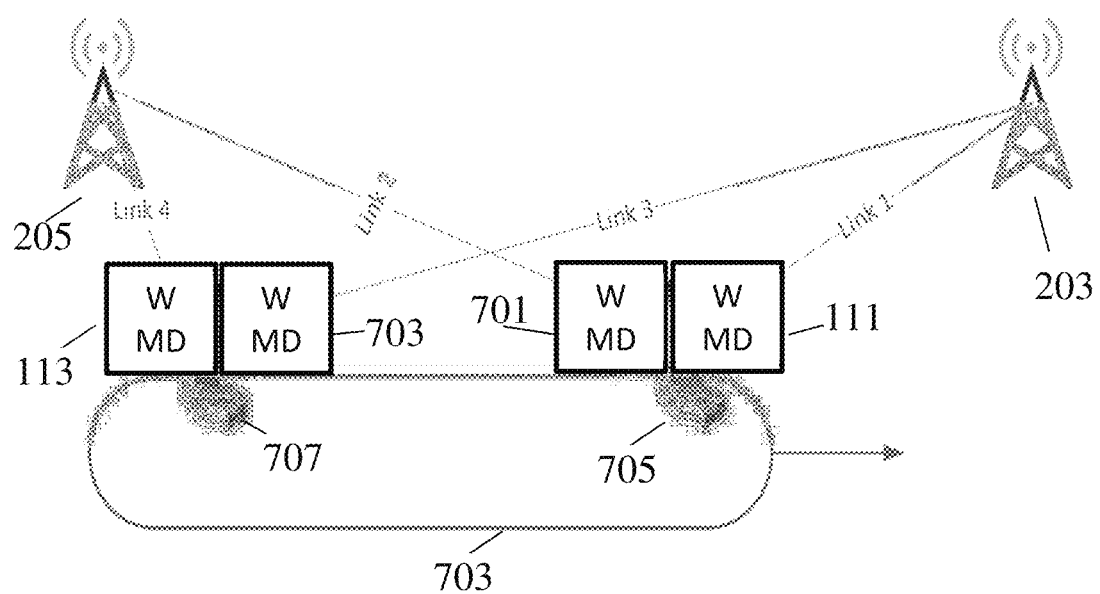
FIG. 8 illustrates an example of elements of a wireless communication system in accordance with some embodiments of the invention.
Figure 9:
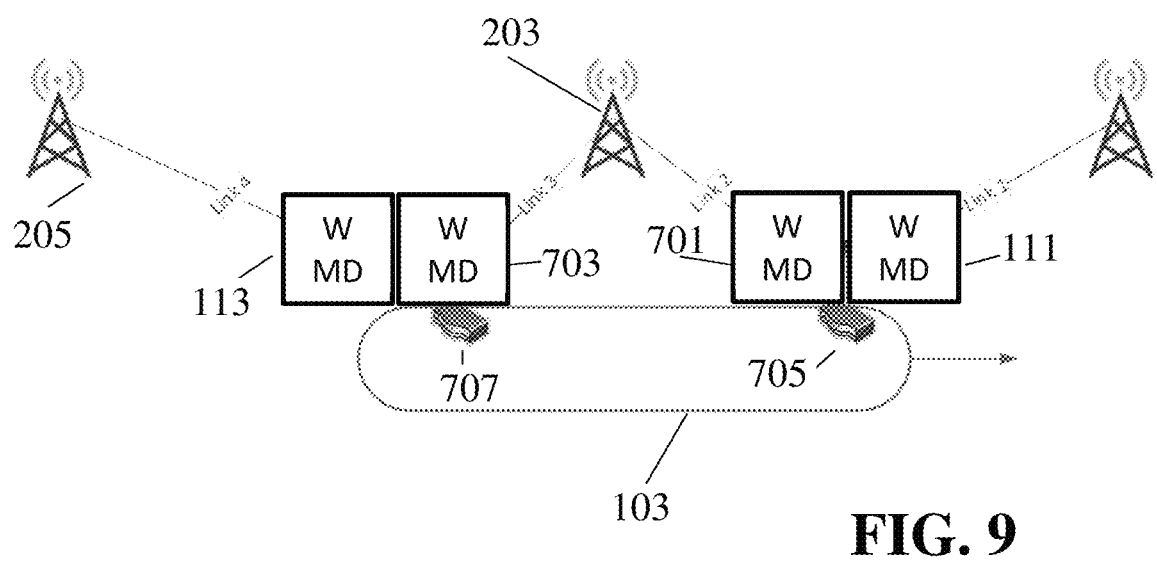
FIG. 9 illustrates an example of elements of a wireless communication system in accordance with some embodiments of the invention.

Similarly, the beam steering may be towards an access point rearwards of the vehicle/train 103 and this may indeed be simultaneous with another of the colocated wireless modems steering a beam towards a forward access point. Thus, often a situation may occur where one set of colocated wireless modems have established links with respectively a forwards and rearwards access point and thus forms beams in substantially opposite directions. At the same time, the other set of colocated wireless modems may have established links with respectively a forwards and rearwards access point and thus also form beams in substantially opposite directions. Further, one pair of non-colocated wireless modems may form beams towards the forwards access point and thus substantially in the same forwards direction, and another pair of non-colocated wireless modems may form beams towards the rearward access point and thus substantially in the same rearwards direction. Such an example is shown in FIG. 8. The establishment of a link may mean that the modem is associated to an access point. The link is available for sending data in either direction. FIG. 9 illustrates an example where the four wireless modems 111, 113, 701, 703 have formed simultaneous links with three different access points.

Thus, the vehicle, such as a train or a bus, may comprise sets of wireless modems that may be reached through a common network element, and specifically via a single common connection point of the common network element.

The examples of FIGS. 7, 8 and 9 employs two pairs of such modems. Typically, the modems that can be reached through a single common connection point and the common network element are substantially co-located and the modems of such a set will for brevity be referred to as co-located modems. However, it will be appreciated that it is not essential for such modems to be co-located.

The vehicle may typically comprise a plurality of such sets of wireless modems. In many embodiments, the sets may be positioned at some distance to each other, such as specifically towards opposite ends of the vehicle. In many embodiments, different wireless modems in different sets may be arranged to form beams in corresponding directions. For example, each set may comprise one wireless modem facing in the forwards direction and one wireless modem facing in the backwards direction. In such scenarios, wireless modems in different sets being arranged to form beams in corresponding directions will be referred to as aligned wireless modems.

The approach may in particular allow each set of co-located wireless modems to form mm wave radio communication links to different access points and may also allow different sets of co-located wireless modems to form links to the same access point. For example, in FIGS. 7 and 8, wireless modem 111 and aligned wireless modem 703 are arranged to establish mm wave radio communication links to the same access point 109. This may provide more efficient communication over the radio air interface in many embodiments and may allow a fast and efficient adaptation to the current radio conditions. This is particularly significant for mm wave radio communication for moving vehicles as the conditions for individual links may change exceedingly quickly and substantially. The approach may provide additional air interface diversity which can increase overall throughput.

Thus, for brevity, conciseness and clarity, modems having the beams formed in substantially the same direction will be referred to as aligned wireless modems and the description will focus on a vehicle comprising a pair of aligned wireless modems having forward facing beams and a pair of aligned modems having rearward facing beams. Beams and radio communication links from different wireless modems to the same access point will also be referred to as aligned beams and aligned radio communication links. Similarly, for co-located modems, the beams and radio communication links will also be referred to as co-located beams and radio communication links.

Aligned wireless modems will typically be at a distance with respect to each other. In many embodiments, the distance between at least two aligned wireless modems of the vehicle will be no less than 5 m, 10 m, 20 m, 50 m, or even 100 m. In many embodiments, at least two aligned wireless modems will be disposed towards opposite ends of the vehicle, for example at the front and back of a bus or on respectively the first and last carriage of a train. Thus, at least two aligned wireless modems will be positioned proximal to opposite ends of the vehicle.

In many embodiments, the distance between at least two aligned wireless modems may be no less than 5, 10, or 100 times greater than a distance from each of the two aligned wireless modems to the nearest of the front and of the back of the vehicle. Thus, in many embodiments, the distance between at least two aligned wireless modems may be no less than 5, 10, or 100 times greater than a distance from the front of the vehicle to the nearest of the two aligned wireless modems. Similarly, in many embodiments, the distance between at least two aligned wireless modems may be no less than 5, 10, or 100 times higher than a distance from the back of the vehicle to the nearest of the two aligned wireless modems.

In contrast to the aligned wireless modems, non-aligned wireless modems may often be positioned close to each other and specifically may typically be positioned such that a pair (or set) of non-aligned aligned wireless modems are substantially co-located. For example, in the specific embodiment described, a pair of forward facing aligned wireless modems are positioned at respectively the front and back of the vehicle, and similarly a pair of rearward facing aligned wireless modems are positioned at respectively the front and back of the vehicle. Further, the forward and backwards facing wireless modems at the front of the vehicle may be substantially co-located, and the forward and rearward facing wireless modems at the rear of the vehicle may be substantially co-located. This colocation may facilitate operation and specifically allow shared network functionality, such as e.g. the colocated non-aligned wireless modems sharing a common NPU for coupling to e.g. an Ethernet switch.

The aligned wireless modems are accordingly at a substantial distance to each other. As the beams are in the same direction, all aligned modems may potentially connect to the same access point and thus multiple wireless communication links may be set up from the vehicle/train to a given access point. Further, due to the distance between the aligned wireless modems, the properties of the wireless links will typically be substantially different and will vary in different ways. Indeed, even in scenarios where the average propagation characteristics to different aligned wireless modems is substantially the same (e.g. the vehicle is far from the access point), the instantaneous conditions may be very different and vary in a typically independent and substantially uncorrelated way. The performance of the individual links will differ because of difference in path loss and fading (fast fading or shadowing) and radio and antenna performance.

In the described system, multiple simultaneous mm wave radio communication links may be set up with associated wireless modems, and a data flow to a specific end node 101 on the vehicle may be able to use such multiple simultaneous mm wave radio communication links. This may provide improved diversity and more efficient handovers between access points etc. as a dynamic use of the available links can be achieved without requiring hard handovers.

However, adapting the air interface to the movements of the vehicle is typically performed by close interaction between the involved network elements and for example a change from one access point to a neighbor access point for a given data flow is often achieved by establishing a new mm wave radio communication link to the neighbor access point followed by a layer 2 routing update (e.g. using ARP) such that data packets are routed via the neighbor access point instead of the initial access point.

However, whereas such approaches work efficiently within close interconnected network sections, it tends to be inefficient and typically far too slow for segmented networks where different segments may not share routing and possibly may be independently managed, controlled, and operated. For example, in the network of FIG. 4, as the train moves, it will be served by access points 109 of different segments and a rerouting is required not only affecting local L2 network functionality but rather requiring changes of the entire path to the LMA.

Figure 10:
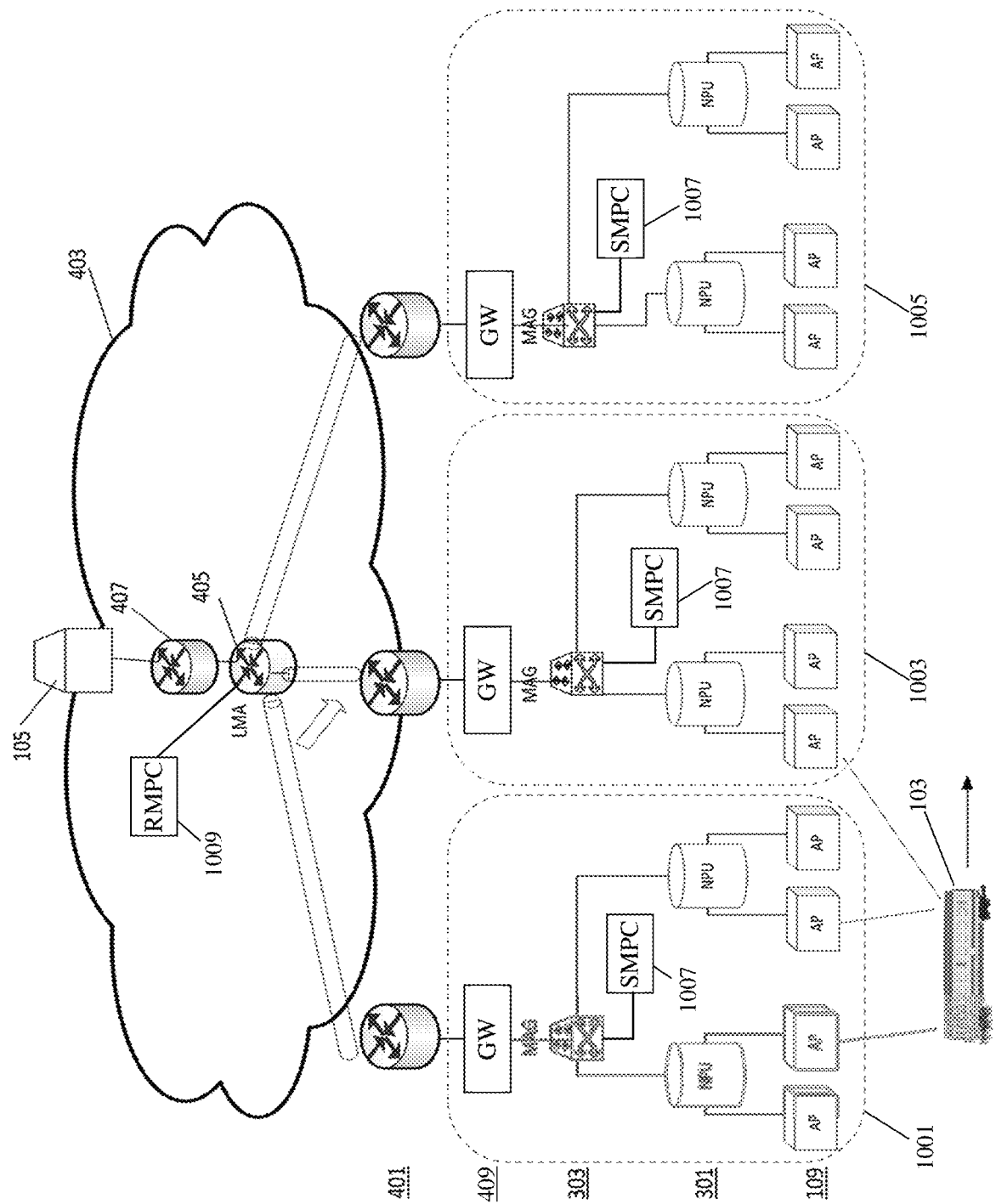
FIG. 10 illustrates an example of elements of a wireless communication system in accordance with some embodiments of the invention.

FIG. 10 illustrates a communication system that includes a segmented fixed network yet provides improved performance and support for communication for vehicles based on access points providing mm wave radio communication links to the vehicle 103. The system corresponds to the communication system of FIG. 4 but includes a number of hierarchically arranged multipath controllers closely interworking to provide improved support of communication with the vehicle 103.

FIG. 10 illustrates the fixed network 107 to comprise a core network 403 coupled to some radio access network segments 1001-1005. The network segments 1001-1005 comprise a segment gateway node 409 which couples to edge routers 401 of the core network 403. Each of the access network segments 1001-1005 comprise a number of radio Access Points (AP) 109 for forming mm wave radio communication links with the wireless modems of the vehicle 103. As the vehicle 103 moves, existing mm wave radio communication links will be dropped, and new ones formed to different access points. The routing may be updated accordingly. However, when links change from access points of one segment to another, the changes may be fundamental and require a substantial adaptation.

In the specific example shown in FIG. 10, the vehicle 103 has established links with two access points of a first segment 1001 and one link with an access point of a second segment 1003. Thus, data for the vehicle may be communicated via three different mm wave radio communication links and two different network segments 1001, 1003.

In the example, each network segment comprises at least one segment multipath controller 1007 which is arranged to communicate with complementary multipath controller on the vehicle 103. In addition, the core network 403 comprises a (root) multipath controller 1009 which communicates with a complementary root multipath controller on the vehicle 103. The multipath controllers 1007, 1009 are hierarchically coupled such that the segment multipath controllers 1007 are arranged to communicate over a plurality of paths with each path comprising a different mm wave radio communication link (and often each path is over a different access point) and the root multipath controller 1009 is arranged to communicate over a plurality of paths with each path comprising a different segment multipath controller 1007. Further, in most embodiments, the segment multipath controllers may be L2 based multipath controllers and may specifically be part of L2 (Layer 2, Data Link Layer) networks (e.g. routing in and out of the segment multipath controllers are based on MAC addresses and do not consider any higher layer addresses such as IP addresses). In contrast, the root multipath controllers may be higher layers (i.e. higher than L2), and specifically L3 and L4 (layer 3, Network Layer and Layer 4 Transport Layer) multipath controllers. The root multipath controller 1009 may specifically perform routing and multipath operations that take IP addresses into account.

A multipath controller in the fixed network will also be referred to as a (fixed) network multipath controller and specifically a multipath controller of a network segment will be referred to as a (fixed) network segment multipath controller. Correspondingly a multipath controller on the vehicle will be referred to as a vehicle multipath controller, and specifically a multipath controller on the vehicle complementary to a network segment multipath controller will be referred to as a vehicle segment multipath controller.

Figure 11:
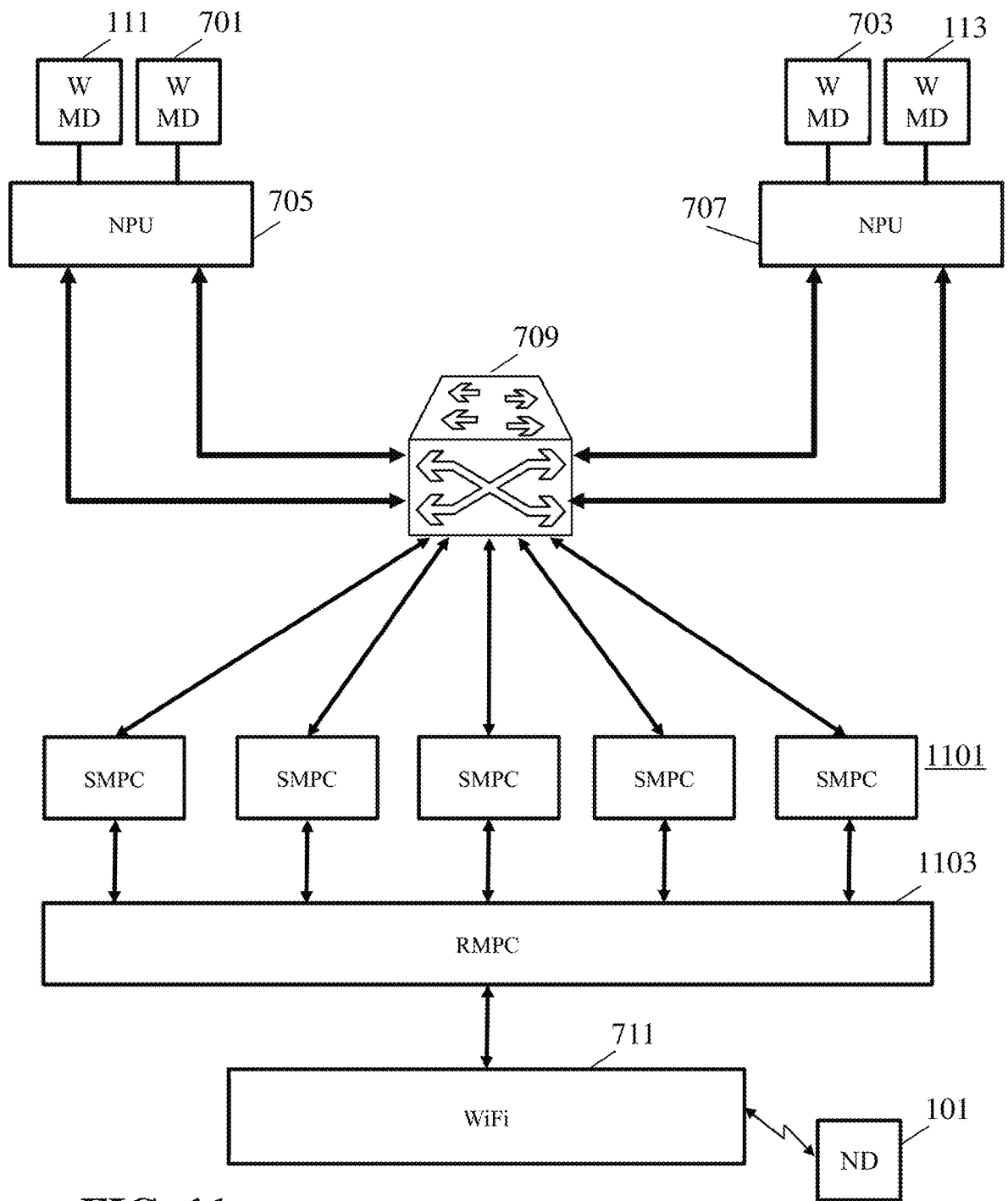
FIG. 11 illustrates an example of elements of a vehicle-based network subsystem of a wireless communication system in accordance with some embodiments of the invention.

As illustrated in FIG. 11, which corresponds to a modified version of FIG. 7, the vehicle 103 may specifically comprise a plurality of vehicle segment multipath controllers 1101 which are coupled to a root multipath controller 1103.

In the example, the wireless modems 111, 113, 701, 703 may dynamically be coupled to any of the vehicle segment multipath controllers 1101. In the example, each of the wireless modems 111, 113, 701, 703 are coupled to the vehicle segment multipath controllers 1101 via the NPUs 705, 707 and the switch/router 709 and the data to/from the wireless modems 111, 113, 701, 703 are routed to the vehicle segment multipath controllers 1101 using a L2 routing, i.e. based on MAC addresses.

In the system, each of the wireless modems 111, 113, 701, 703 may thus be arranged to be coupled with any of the vehicle segment multipath controllers 1101 and specifically the data packets communicated over a mm wave radio communication link by a given wireless modem 111, 113, 701, 703 may be linked with a specific multipath connection of one of the vehicle segment multipath controllers 1101. The coupling of wireless modems 111, 113, 701, 703 to a vehicle segment multipath controller 1101 may dynamically be changed as the vehicle moves (as will be described in more detail later).

Each of the vehicle segment multipath controllers 1101 may (possibly temporarily) be associated with one segment of the fixed network 107 and specifically each vehicle segment multipath controllers 1101 may be paired with one fixed segment multipath controller 1007.

Thus, each of the vehicle segment multipath controllers 1101 is paired with a complementary fixed segment multipath controller 1007 such that the pair of multipath controllers are arranged to perform multipath communication between them. Each of the multipaths is linked to one mm wave radio communication link and one wireless modem (in some embodiments, one or more of the multipaths may include communication with the vehicle using a different communication system, such as a cellular 3GPP communication system).

In some embodiments, the vehicle network may include one vehicle segment multipath controller 1101 for each segment of the fixed network that the vehicle will encounter. For example, if the vehicle is a train travelling along a track between two destinations, a vehicle segment multipath controller 1101 may be implemented and initialized in the train for each segment covering a part of the track between the destinations.

The vehicle network comprises the vehicle root multipath controller 1103 which is coupled to the vehicle segment multipath controllers 1101 with each vehicle segment multipath controller 1101 providing a path of the multipaths for the root multipath controller 1103.

In the system, a pair of segment multipath controllers performing multipath communication between individual segments of the fixed network and the vehicle network are established with the paths using different mm wave radio communication links over the air interface. Further, a pair of root multipath controllers performing multipath communication between the fixed network, and specifically the core network, and the vehicle network is established with the paths using different mm wave radio communication links between segment multipath controllers. Thus, a hierarchical approach of multipath controllers is established with segment multipath controllers forming the multiple paths of the root multipath controllers.

In many embodiments, the segment multipath controllers may be L2 multipath controllers and the routing between complementary segment multipath controllers, and between the segment multipath controllers and the access points/wireless modems, may be based on L2 routing, and specifically may be based on MAC address routing. In contrast, the root multipath controllers may be L3 or higher multipath controllers and the routing between a root multipath controller and the connected/coupled segment multipath controllers may be based or include routing based on IP addresses.

The approach may provide substantially improved performance in many embodiments. It may often provide a very efficient operation for segmented networks and may allow a quick and efficient adaptation to changes in the network configuration due to the vehicle's movement. The segment multipath controllers may specifically provide fast adaptations to changes in the radio conditions including providing a fast adaptation of relative resource usage across different mm wave radio communication links due to changes in the radio propagation conditions, including a fast adaptation to mm wave radio communication links becoming available and disappearing.

Further, this can be achieved using a relatively low complexity multipath operation. The segment multipath controllers may typically be amenable to local adaptation and operation which allows fast localized adaptation and optimization, such as specifically based on L2 properties and considerations. In addition, the root multipath controller allows adaptation and seamless operation to be efficiently extended over multiple segments while allowing efficient localized adaptation and operation. The root multipath controllers can provide for an efficient resource usage and adaptation over different segment multipath controllers and may specifically operate at higher layer level supporting separate segments e.g. from a core network such as the Internet. The approach may specifically allow such higher layer multipath controller operation to be used in a network where the dynamic changes are caused by vehicle movement and radio propagation considerations rather than resulting from network-based issues. The approach employs an advantageous synergistic interoperation to yield a highly efficient and advantageous communication support for fast moving vehicle in a segmented network.

It will be appreciated that the arrangements to a large extent is symmetric for the fixed network and the vehicle network, and that comments and descriptions provided for one apply, mutatis mutandis, to the other. For example, for both the fixed network and the vehicle network, routing between segment controllers and the access points/wireless modems may be L2 routing and routing between the segment multipath controllers and the root controller may be L3 or higher routing.

Most practical networks supporting communication for a fast-moving vehicle over larger distances and areas tend to be very complex and at any given time there will typically be a large number of potential connections, routes, and paths that can be used to support the communication. Further, such connections, routes, and paths will have different and often fast changing properties. Therefore, the adaptation and optimization challenges to the system are very difficult to address. Further, the segmentation of the fixed network means that much of the optimization and adaptation functions may not have full information of the current network conditions as information related to a segment are typically not available outside the segment.

The described hierarchical multipath controller approach utilizes multipath functionally to provide an adaptation to the changed conditions, and specifically changed radio conditions, by multipath controllers dynamically and flexibly adapting the utilization of possible multipaths. Further, fast and efficient adaptation can be performed by local multipath controllers that may have access to specific (intra-segment) information, such as specifically radio condition information, while at the same time allowing a root multipath controller to adapt and manage flow control across different segments. This root multipath controller may be a higher layer and often slower multipath controller operation that may not have any, or limited, specific information of conditions within each segment.

The approach may in many embodiments provide efficient adaptation within a segmented network even if relatively low complexity and relatively localized criteria are used by each of the multipath controllers for selecting between possible paths. For example, each multipath controller may simply monitor throughput for each of its multiple paths and allocate data packets to the paths with the highest throughput. Such an approach may allow the segment multipath controllers to quickly switch between different paths as the train moves and existing mm wave radio communication links drop and new ones are formed. It further allows switching between different segments as the root multipath controller detects that a new segment becomes active and thus the throughput for the corresponding path and segment multipath controller increases. This may be based on higher layer properties but as it is combined with the faster and more localized segment multipath operation, this will typically be acceptable as it is a rarer event. Further, the multipath approach may inherently allow e.g. seamless handovers as data may simultaneously be communicated over a plurality of paths.

Figure 12:
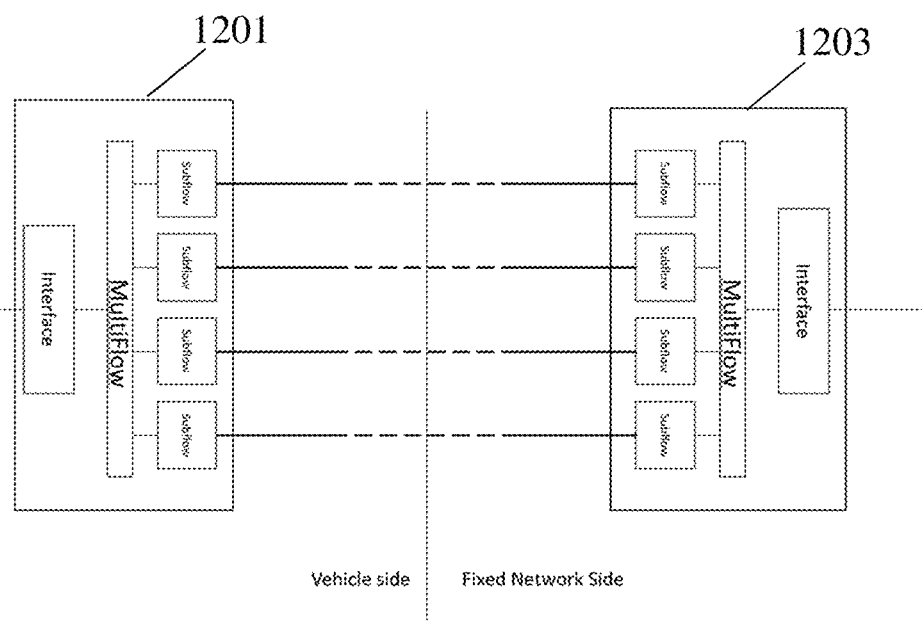
FIG. 12 illustrates an example of elements of a multipath controller arrangement suitable for a wireless communication system in accordance with some embodiments of the invention.

FIG. 12 illustrates an example of two multipath controllers utilizing subflows of multiple paths for communication. In the example, a vehicle multipath controller 1201 may provide a single flow connection for the vehicle side network and a fixed network multipath controller 1101 may provide a single flow connection for the fixed network. The connection between the two multipath controllers is however by a plurality of subflows each of which may use a different path. Thus, a data packet received by one multipath controller 1201 may be communicated to the complementary multipath controller 1203 via one of the sublows/paths (and vice versa).

For an example where FIG. 12 corresponds to segment multipath controllers, each of the subflows/paths is via a different wireless modem and mm wave radio communication link. For an example where FIG. 13 corresponds to root multipath controllers, each of the subflows/paths is via a different pair of complementary segment multipath controllers.

Figure 13:
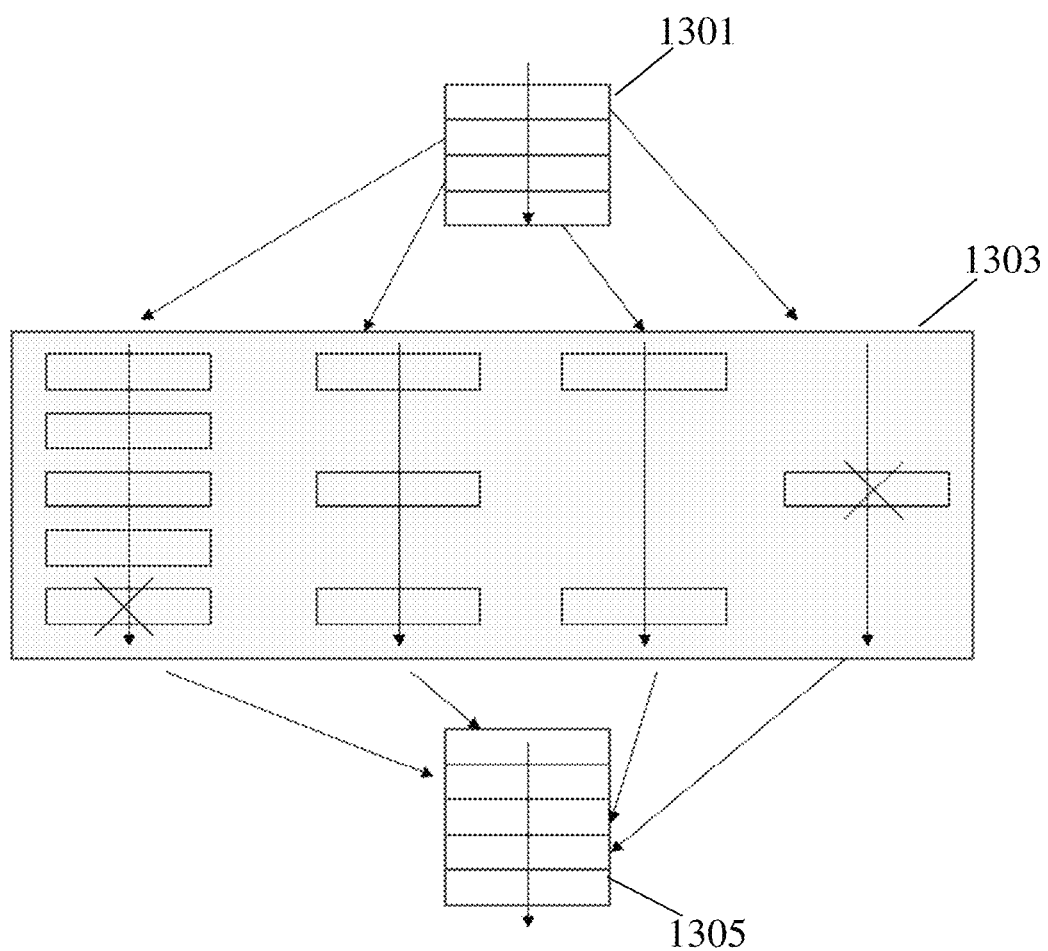
FIG. 13 illustrates an example of elements of a multipath controller arrangement.

FIG. 13 illustrates an example of the operation of the multipath subflow communication. In the example, an input set of data packets 1301 are received in a given order. These may be routed via a plurality of subflows 1303 with data packets being distributed over the different subflows 1303. The subflows 1303 may then be combined into a single flow 1305, i.e. a single set of output data packets may be generated.

Due to different properties of the different subflows, the data packets may be received in a different order than in the input set of data packets 1301, and the receiving multipath controller may reorder the output data packets to have the correct order to generate and in-sequence data output.

In some embodiments, the multipath controllers may comprise (in addition to one (or more) mm wave links/connections) a path/or connection that may utilize a different air interface/radio access technology, such as e.g. an LTE communication link. This may be the case both for segment multipath controllers and for root multipath controllers.

In some embodiments, the multipath controllers may be arranged to dynamically and flexibly manage the subflow communication. In some embodiments, the multipath controllers may be arranged to communicate data simultaneously over several paths/flows. For example, a multipath controller may maintain a FIFO buffer for each subflow and may allocate new data packets to subflows depending on the level of filling of each subflow buffer. In other embodiments, a slower or less flexible approach may be used. For example, the multipath controller may simply allocate data to one subflow as long as the buffer level does not increase above a given level. If this level is exceeded, it may indicate that the link/path for that subflow is no longer efficient (e.g. due to the mm wave radio communication links for that path no longer being able to support communication) and it may switch to exclusively use a different subflow for future communication.

It is a particular advantage of the described approach that even such low complexity operations can provide a highly advantageous and reliable operation for segmented networks. However, as will be described in more detail later, even more advantageous performance can often be achieved by more complex algorithms being used for allocating data packets to subflows.

Further, in many embodiments, the multipath controllers may also be arranged to provide mobility anchor functionality, and in particular, each of the segment multipath controllers may be a Mobile Access Gateway (MAG) for that segment and the root multipath controller may be a Mobility Anchor (MA) for the vehicle 103. In some embodiments, the segment multipath controllers and the root multipath controller may be MAG and MA functionality for some or all end nodes on the vehicle 103.

In other embodiments, the root multipath controller and the segment multipath controllers may replace the MAG and MA in e.g. systems such as that of FIG. 2.

In many embodiments, the root controller is coupled to the plurality of segment multipath controllers via a Layer 3 switched network section. This may be the case for the fixed network, the vehicle network, or typically for both the fixed network and the vehicle network. In many embodiments, at least one segment multipath controller, and typically all of the segment multipath controllers, is coupled to the wireless modems via a Layer 2 switched network section. This may be the case for the fixed network, the vehicle network, or typically for both the fixed network and the vehicle network. The L2 network may extend over the air interface and communication from a fixed network segment multipath controller to a wireless modem may be via a L2 connection including an access point.

Specifically, in many embodiments, communication between complementary segment multipath controllers for at least one of the multiple paths, and typically for all of the multiple paths, may be via a L2 switched connection/coupling. Thus, the routing between complementary multipath connection ports is based on MAC addresses and does not consider any higher level addressing such as IP addresses.

In a L2 network (section), routing of data packages may specifically be based on MAC address routing and switching without any consideration of higher layer addresses such as IP addresses. In contrast, the routing for a L3 network (section) may (at least partly) be based on L3 addresses, such as IP addresses.

The use of both L2 and L3 network sections respectively between complementary segment multipath controllers and between hierarchically coupled segment multipath controllers and the root multipath controller provides an overall support for communication with the vehicle that allows both fast and low complexity adaptation to changes in the network configuration combined with efficient multi-segment support. The L3 based operation of the root multipath controller allows the higher layer functions to compensate and address issues arising in the L2 network sections. For example, it may provide retransmission and segment multipath adaptation to reflect changes in the local network segments. At the same time, highly efficient, fast, and reduced complexity operation can be achieved locally, thus allowing fast adaptation to changes in the network configuration caused by the vehicle movement, e.g. by using L2 routing operations such as ARP protocols and procedures.

As described previously, the selection of paths for data packets by a segment multipath controller may simply be based on considering throughput and specifically may simply consider the level of a FIFO buffer for each path. For example, a new data packet received by the segment multipath controller may simply be allocated to the least full FIFO buffer.

However, a particular advantage of the described approach is that it may further allow more complex and efficient approaches to be used that may provide faster adaptation and more efficient use of the available air interface resource.

In many embodiments, at least one of the segment multipath controllers is arranged to allocate data to paths of the plurality of wireless modems in response to a radio link condition indication for at least one mm wave radio communication link.

A radio link condition indication for a mm wave radio communication link may be any indication of a quality of the link and specifically may be any measure indicative of a signal to noise ratio, capacity, error rate, throughput, signal strength etc.

In some embodiments, a radio link condition indication may specifically be a throughput indication. The throughput indication may for example be determined as a throughput measure derived from measurements of a plurality of parameters.

For example, for a fixed network segment multipath controller, an access point may continuously report back the received signal to noise ratio or signal strength for each mm wave radio communication link to the vehicle. The fixed network segment multipath controller may then convert this to a throughput value, e.g. based on a predetermined formula or Look-Up-Table (LUT). A throughput may be determined for each path and the segment multipath controller may then allocate data packets to each of the subflows path according to the throughput value, specifically with more data packets being allocated to subflows which currently indicate a high throughput.

For a vehicle based segment multipath controller, each of the wireless modems may report a signal-to-noise ratio or a signal strength to the multipath controller and the multipath controller may use this to determine the throughput and operate as the network segment multipath controller. In some embodiments, air interface scheduling, monitoring, link management etc. may be handled by a dedicated connection manager function. In some embodiments may handle a plurality, and possibly all, of the wireless modems of the vehicle and thus may provide radio link indications for all wireless modems/mm wave radio communication links of the vehicle to the segment multipath controller.

In some embodiments, the throughput for a mm wave radio communication link may directly be measured and used as a radio link condition indication.

In many embodiments, a radio link condition indication for a mm wave radio communication link may be a currently applied modulation and coding scheme for the mm wave radio communication link. In many systems, the applied modulation and coding scheme used for communication is dynamically adapted in order to maximize the throughput of the mm wave radio communication link. For example, if the error rate increases above a given threshold, a control message may be transmitted to cause the modulation and coding scheme to be changed to a more reliable but lower data rate scheme and if the error rate decreases below a given threshold, a control message may be transmitted to cause the modulation and coding scheme to be changed to a less reliable but higher data rate scheme.

In such systems, the currently determined modulation and coding scheme may directly reflect a data rate for communication over the mm wave radio communication link. The currently selected/applied scheme may thus reflect the quality of the mm wave radio communication link. For example, the less the attenuation and noise, the higher the data rate.

In some embodiments, a beacon signal strength value may be used as a radio link condition indication. For example, the measured beacon signal strength may be converted into a specific measure indicative of the quality of a mm wave radio communication link such as a throughput or attenuation for that mm wave radio communication link.

Such a radio link condition indication may be particularly advantageous as it is not reliant on active transmission of data over the mm wave radio communication link. It may be used for a mm wave radio communication link which has been established but which is currently not active. In such a case, it is possible that no data is exchanged at all over the mm wave radio communication link. However, the wireless modem supporting the mm wave radio communication link may measure the beacon strength, such as e.g. the current RSSI level, and either use this directly or convert it to another value. For example, a predetermined formula or LUT may provide a throughput estimate or a modulation and coding scheme estimate as a function of the RSSI level.

It will be appreciated that a plurality of radio link condition indications may be used for each mm wave radio communication link or equivalently that each radio link condition indication may be a composite indication comprising a plurality of values or a combined value for a plurality of parameters indicative of a radio link condition.

It will be appreciated that a segment multipath controller may apply any suitable algorithm for selecting between the different paths/subflows for a given data packet, and in particular may apply a comparison criterion between the radio link condition conditions for the different paths.

For example, in some embodiments, the segment multipath controller may simply be arranged to select the path for which the radio link condition indication indicative of the highest quality or the highest throughput. Such a decision may for example include a suitable amount of low pass filtering and/or hysteresis top provide the desired dynamic performance and operation.

The approach may provide an improved adaptation and optimization to the changing conditions while at the same time allowing a low complexity implementation and operation. In many such embodiments, the root multipath controller may in contrast to the segment multipath controllers be arranged to not allocate data to subflows/paths based on any radio link condition indications for any mm wave radio communication link. Specifically, in many embodiments, the root multipath controller may be arranged to perform the path selection without any consideration of any radio link parameters or properties.

In many embodiments, the root multipath controller may be arranged to perform the path selection/allocation of the data packets to paths based on transport layer (L3) properties for the paths, and specifically without considering any lower layer parameters.

In such embodiments, the root multipath controllers may perform the allocation of data packets to paths based on properties that can be determined by the root multipath controller, and specifically the allocation may be based on L3 or (higher) operations that can be performed by the root multipath controller. Thus, the root multipath controller may be implemented such that the operation does not require any additional information to be provided from the individual segments, and indeed a substantial advantage of the described system that this is possible to implement such a structure where efficient overall operation can be achieved based on localized operation. The approach may specifically facilitate introduction of the described functionality to an existing network, and for example may allow root and segment multipath controllers from different manufacturers to interwork without requiring detailed and specific knowledge of proprietary algorithms.

In many embodiments, the root multipath controller may be arranged to allocate data to paths/subflows independently of allocation of data to paths/subflows by the segment multipath controllers. The allocation/selection of paths/subflows by the root multipath controller may be performed without any knowledge, information, consideration, or data of the allocation of data to subflows/paths performed by the segment multipath controllers. Indeed, in many embodiments, a root multipath controller may be completely unaware of any segment multipath controllers and may not have any information relating to the hierarchical multipath arrangement. Rather, the root multipath controller may simply perform allocation based on the locally determined conditions, such as specifically based on locally measured throughput values for the individual paths or buffer/queue levels.

In other embodiments, the root multipath controller (in the fixed network, the vehicle network, or both) and the connected segment multipath controllers may be arranged to share information that can be used by the root multipath controller to perform the path allocation/selection.

Specifically, one, more, or all of the segment multipath controllers may transmit data indicative of L1 or L2 (physical or data link layer) properties to the root multipath controller. The multipath controller may then use this information to select between different subflows for data packets.

Thus, in many embodiments, the segment multipath controllers may specifically provide cross layer assistance data which provides L1 or L2 information to a L3 (or higher) multipath controller.

As a specific example, the segment multipath controllers may be arranged to transmit radio link condition indications to the root multipath controller. For example, a segment multipath controller may simply forward radio link condition indications that it receives from the access points or wireless modems, and the root multipath controller may process these to generate throughput indications. E.g. a root multipath controller may determine a throughput corresponding to each link for a given segment multipath controller and may then add these together to generate a combined throughput for the segment multipath controller. These may be calculated for all segment multipath controllers and the allocation of data packets to subflows of the root multipath controller may be made in dependence on the throughput for each segment multipath controller corresponding to a path.

In some embodiments, the segment multipath controllers may perform various processing based on L1 and L2 properties in order to generate parameter values that are transmitted to the root multipath controller. For example, each segment multipath controller may determine a combined total throughput estimate based on the received radio link conditions received from the APs or wireless modems and may send the combined throughput estimate to the root multipath controller.

In some embodiments, the segment multipath controllers may specifically be arranged to transmit path change indications to the root multipath controller where the path change indication may be an indication that a path condition for the segment multipath controller has changed or is considered likely to change. For example, a segment multipath controller may detect that the throughput for one of the active paths has reduced substantially or is considered likely to reduce substantially and may in response transmit an indication to the root multipath controller indicating that the throughput has changed/is likely to change and may accordingly change the data packet allocation to use other paths.

The transmit path change indications may specifically be related to L1 and L2 properties. For example, the segment multipath controller may detect that the signal to noise ratio or signal strength indications received from a specific access point are quickly degrading. This is likely to indicate that the corresponding mm wave radio communication link is in the process of dropping due to the train moving away from the access point. In response to this detection, the segment multipath controller may transmit a radio link drop indication to the root multipath controller and the multipath controller may change the allocation of data packets to bias these away from the corresponding path. Similarly, a segment multipath controller may detect that radio conditions are quickly improving reflecting that the vehicle is moving towards the corresponding access point. It may then send an indication of link establishment to the root multipath controller which may proceed to bias data packets towards this segment multipath controller.

As another example, in some embodiments, a segment multipath controller may detect that a number of data packets have not been received (i.e. there may be a detectable gap in the sequence of received data packets). This may be indicated to the root multipath controller which may take corrective action, such as transmit a retransmission request or to start a process to detect whether the missing data packets potentially have been received from another segment multipath controller.

As another example, a segment multipath controller may e.g. detect that a given mm wave radio communication link has dropped and it may proceed to empty the corresponding FIFO buffer resulting in a number of data packets being dropped. In situations were a retransmission scheme is implemented between the root multipath controllers, this may eventually result in the data packets being retransmitted. However, it may be some time before the packet loss is detected by the root multipath controller. Therefore, the segment multipath controller may when clearing the FIFO buffer also send a message to the root multipath controller indicating that, and which, data packets are being discarded. Accordingly, the root multipath controller may proceed to retransmit the discarded data packets, e.g. via a different segment multipath controller.

The transmission of additional information may thus allow a more efficient and often much faster adaptation by the root multipath controller and thus the system as a whole. In particular, rather than requiring the root multipath controller to detect changes using slower higher layer functions and properties, it may allow adaptation based on lower layer (L1 and L2) properties that are not natively present at a L3 root multipath controller.

In many embodiments, communication between multipath controllers may be based on tunneling, i.e. data between multipath controllers may be communicated in accordance with a tunneling protocol.

Specifically, communication between the two complementary multipath controllers may use data packet tunneling. Specifically, tunneling may utilize UDP data packets, i.e. a UDP tunnel protocol may be applied.

In many embodiments, the communication between complementary root multipath controllers may use a tunneling approach and may specifically use a UDP tunnel protocol. Similarly, in many embodiments, the communication between complementary segment multipath controllers may use a tunneling approach and may specifically use a UDP tunnel protocol.

In many embodiments, the communication between complementary multipath controllers may use a tunneling approach where data is encapsulated within data packets in accordance with a given protocol, such as the UDP protocol.

In the tunneling approach, data packets received at one multipath controller for communication to the complementary multipath controller are not directly forwarded but may be encapsulated within a tunneling data packet by the multipath controller. The encapsulation typically adds additional data, such as a header, to provide a data packet in accordance with a suitable protocol and with the payload of this data packet being the original received data packet. The tunneling packet may comprise additional fields, and typically an additional header comprising various tunneling data, such as control or management data.

The encapsulation typically includes maintaining the entire received data packet in an unmodified form and thus the encapsulated data packet may be maintained in accordance with the received data packet format/protocol.

The encapsulation of the data packet may specifically add data that is in accordance with a different data packet format/protocol than the encapsulated data packet. Thus, the received data packet may be transmitted to the complementary multipath controller using a different data protocol.

In many embodiments, the tunnel may be a UDP tunnel and the encapsulated data packets may be UDP data packets, and the communication between the multipath controllers may be in accordance with the UDP data protocol.

The multipath controllers may be arranged to establish each subflow as a tunnel and the tunnels for different subflows may be different in the sense that the data packet flow fed into one of the subflows may be communicated over the corresponding path to the complementary multipath controller where it is restored as output data for that subflow.

In addition, a multipath controller may provide a combined tunnel by combining subflows into a single data packet flow.

In particular, the multipath controller may be arranged to include sequence numbers in the encapsulated data packets that are transmitted to the complementary multipath controller. The complementary multipath controller may order received data packets in accordance with the sequence numbers to generate a data packet flow with the same data packet order as that when received at the source multipath controller.

In many embodiments, the encapsulated/tunnel data packets, and specifically the encapsulation headers, may comprise both a combined flow data sequence number and a subflow sequence number. For example, a multipath controller may receive a data packet and may proceed to encapsulate a received data packet by adding an encapsulation header that comprises a sequence number field in which a sequence number is added reflecting the received data packet order.

In addition, the header may include a subflow sequence number which is used to provide a sequence number specific for each subflow. Thus, when an encapsulated data packet is fed to a given subflow, an appropriate subflow sequence number is inserted in the subflow sequence number field. The receiving multipath controller may first process each subflow sequence number to generate an ordered subflow data sequence for each subflow and may then order the data packets of these flows into an ordered combined data packet sequence based on the combined flow data sequence number.

The tunneling approach may be used between complementary root multipath controllers and/or between one or more pairs of complementary segment multipath controllers. The tunneling approach may thus provide an efficient way of establishing the multipath communication between two segment multipath controllers or between the root multipath controllers. The approach may be used hierarchically such that the encapsulated data packets of a root multipath controller tunnel may be further encapsulated in the segment multipath controller to provide the segment multipath controller tunnel.

In some embodiments, UDP tunneling may thus be employed by packaging (parts of) the payload packets into multi-path subflows. These subflows are built from UDP datagrams. The UDP subflows may comprise enough extra information to reconstruct the correct order of parallel subflow packets and may thus be enhanced UDP tunnels. The subflows may be dynamic in their use (but static in their configuration) and the dynamics may relate to network performance.

The hierarchical UDP tunneling may be a consequence of hierarchical layers of (automated) subflow load balancing, with inner (segment) subflows being unaware of outer layer (root) subflows load balancing.

The load balance aspect of subflow control may be based on some level of protocol usage and thus the segment aggregation/multipath operation may use a protocol to manage flow rate load balance. This can e.g. be used for reliable delivery, dead end recovery, and filing in of missing packets.

The outer aggregation may have its own flow control, typically (partly) associated with the constraints of the segment aggregation flow rates and the constraints of purely flow control over a latent network.

The tunneling may further provide a number of additional advantages and may specifically allow the specific multipath communication/operation of the multipath controllers to be customized and optimized for the specific operation desired. Indeed, the tunneling approach may allow or facilitate proprietary operation.

In many embodiments, the encapsulation data/header may for example be arranged to include specific data that can be used by the multipath controller to provide a specific function. For example, the tunneling approach may allow the multipath controllers to communicate dedicated and e.g. proprietary data while at the same time allowing the communication to be distributed in a standardized network. For example, a root multipath controller and a segment multipath controller may communicate proprietary data in accordance with a proprietary protocol via a standardized IP network using UDP tunneling.

The tunneling approach may thus allow improved performance as it may allow/facilitate dedicated and proprietary operations to be performed at the multipath controllers, and it may specifically allow a flexible communication of data between multipath controllers. As a specific example, tunneling may be used to communicate Layer 1 and 2 properties for the air interface (e.g. radio link conditions) from a segment multipath controller to a root multipath controller over a L3 network.

In many embodiments, all data communicated to and from a given vehicle may be via the two complementary root multipath controllers. Thus, all data from the vehicle network, and all data from the end nodes on the vehicle, may be routed to the vehicle network root multipath controller and from there to the fixed network root multipath controller and from there on to the appropriate correspondent node. Similarly, all data from the fixed/core network, and all data from the correspondent nodes to the end nodes of the vehicle, may be routed to the fixed network root multipath controller and from there to the vehicle network root multipath controller and from there on to the appropriate correspondent node.

Thus, in such embodiments there may only be a single vehicle network root multipath controller and a single fixed network root multipath controller for each vehicle.

Similarly, in many embodiments, all data communicated between a vehicle and a given network segment may be via a single fixed network segment multipath controller and a single vehicle network segment multipath controller. In such embodiments there may only be a single vehicle network segment multipath controller and a single fixed network segment multipath controller for each vehicle and each segment respectively.

In some embodiments, the data handled by a given root multipath controller pair may only be a subset of the data from all end nodes of vehicle to correspondent nodes. Thus, in some embodiments, a given root multipath controller may only handle e.g. a subset of connections/data flows between end nodes and correspondent nodes.

For example, in some embodiments, the support of communication from the vehicle may include support of different service classes. In such embodiments, the vehicle and core network may comprise a plurality of different root multipath controllers with each of the root multipath controllers handling a subset of the service classes.

Thus, in such embodiments, flows/sessions/connections may be set up to comply with a given service class and the root multipath controller that is used as a gateway point for each flow/session/connection depends on the service class.

The approach may allow the root multipath controller to be adapted and optimized for the specific service class and specifically each root multipath controller may be arranged to ensure that the service parameters for each service class are met. For example, the root multipath controllers may be arranged to ensure a maximum latency or data rate. E.g. the root multipath controllers may operate in accordance with suitable communication protocols ensuring the desired quality (e.g. selecting protocols ensuring low error rates using retransmission, maximum latency protocols etc.).

As a specific example, the system may support different Quality of Service (QoS) classes with each root multipath controller pair supporting a different QoS class.

In some embodiments, separate segment multipath controllers may be provided for each root multipath controller pair, and thus specifically different segment multipath controllers may be provided for separate service/QoS classes. This may provide facilitated operation and complexity and may allow the segment multipath controllers to be optimized for the specific service class.

It will be appreciated that the root and segment multipath controllers may be implemented in any suitable way and at any suitable location.

In some embodiments, the core network 403 may comprise a computation network node which is arranged to provide root multipath controller functionality. For example, whenever communication support is required for a vehicle, the computation network node may initialize a root multipath controller function as a software algorithm. This root multipath controller may be allocated an IP address, and this may be provided to the vehicle where a complementary root multipath controller function may be implemented. The IP address of this vehicle based root multipath controller is provided to the computation network node.

Further each of the network segments may comprise a similar computation network node for establishing a segment multipath controller for each vehicle. When initializing support for a new vehicle, the initialization of the root multipath controller in the core network may include this contacting a segment computation node in each required segment requesting that a segment multipath controller function is setup for the vehicle. Each segment computation device may initialize software implementing this and report an IP address to the core network computation device allowing communication between these based on IP addressing. The addresses may further be provided to the vehicle allowing the segment multipath controllers to be set up in the vehicle knowing the addresses of the corresponding network segment multipath controllers. The vehicle may possibly respond with the IP addresses of the complementary vehicle-based segment multipath controllers.

In some embodiments, a more distributed computational resource approach may be implemented. For example, a plurality of network nodes, and specifically often a plurality of access points may comprise functionality for implementing one a more segment multipath controller functions. Whenever a segment multipath controller is required to support a new vehicle, one of the unused segment multipath controller resources available at any of the network nodes is allocated. The allocation, control, and management of the segment multipath controller resources may for example be by a control network node that keeps track of the multipath controller resources at different network nodes/access points, and which interfaces between these and the root multipath controller when initializing new segment multipath controllers.

In some embodiments, the vehicle network may as part of the initialization be provided with a list of predetermined network addresses for complementary segment multipath controllers in the fixed network. For example, it may be known which path the vehicle will move (e.g. it may be a train or a bus following a predetermined route) and thus segment multipath controllers may be established in each segment that the vehicle will pass through.

A list of addresses for these fixed network multipath controllers may be provided to the vehicle and stored prior to the vehicle commencing the journey. The vehicle may for example set up a segment multipath controller for each address in the list. Thus, prior to the vehicle a root multipath controller may be initialized and coupled to a plurality of segment multipath controllers with one segment multipath controller being provided for each segment. Each of the segment multipath controllers may have subflow port for each wireless modem such that each segment multipath controller can provide a path to the complementary segment multipath controller via each of the wireless modems. As the vehicle moves along the route, connections between the complementary root multipath controllers may be formed via appropriate segment multipath controllers and wireless modems as the different mm wave radio communication links are established and dropped. This may be achieved simply by the multipath controller performing local multipath operations and by the allocation of data packets to currently active subpaths.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Features of subclaims dependent from the apparatus claims (vehicle side) are also appropriate for and apply to the fixed network claims. Features of subclaims dependent from fixed network claims the are also appropriate for and apply to the apparatus claims (vehicle side). A feature of a root multipath controller, segment multipath controller, access point, vehicle network of an apparatus claim also applies to a root multipath controller, segment multipath controller, wireless modem, fixed network of a fixed network claim. A feature of a root multipath controller, segment multipath controller, access point, fixed network of a fixed network claim also applies to a root multipath controller, segment multipath controller, wireless modem, vehicle network of an apparatus claim.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example and shall not be construed as limiting the scope of the claims in any way.

I claim:

1. An apparatus for a communication system for supporting communication between at least one end node of a vehicle and at least one remote correspondent node via a fixed network comprising a plurality of network segments, the apparatus comprising:
   a plurality of wireless modems, each wireless modem being arranged to establish a mm wave radio communication link to an access point of a plurality of wireless access points of the fixed network, each wireless access point having a directional antenna arrangement for mm wave radio communication using directional beams, each wireless modem being located on the vehicle and employing an electronically steerable beamforming directional antenna having a main beam for establishing the mm wave radio communication link;
   a plurality of segment multipath controllers located on the vehicle, each multipath segment controller having multipath connections coupled to the plurality of wireless modems for multipath communication with a complementary segment multipath controller of a network segment of the fixed network, the network segment being different for different segment multipath controllers of the plurality of segment multipath controllers; and
   a root multipath controller located on the vehicle and having multipath connections coupled to the plurality of segment multipath controllers and being arranged to perform multipath communication with a complementary root multipath controller of the fixed network.

2. The apparatus of claim 1, wherein the root multipath controller and the plurality of segment multipath controllers are arranged to communicate a combined data flow for a plurality of end nodes of the vehicle.

3. The apparatus of claim 1, wherein at least a first segment multipath controller of the plurality of segment multipath controllers is arranged to allocate data to paths of the plurality of wireless modems in response to a radio link condition indication for at least one mm wave radio communication link.

4. The apparatus of claim 3, wherein the mm wave radio communication link includes at least one of:
   a radio signal strength indication;
   a throughput indication;
   an error rate indication; and
   a signal to noise ratio indication.

5. The apparatus of claim 1, wherein at least a first segment multipath controller of the plurality of segment multipath controllers is arranged to address data packets from a first wireless modem to a first complementary segment multipath controller using a first network address selected from a stored list of predetermined network addresses for the plurality of complementary segment multipath controllers, a selection of the first network address being based on an access point identity for an access point communicating with the first wireless modem.

6. A fixed network for a communication system supporting communication between at least one end node of a vehicle and at least one remote correspondent node via the fixed network, the fixed network comprising a plurality of network segments and:
   a plurality of access points, each access point being arranged to establish a mm wave radio communication link to a wireless modem of a plurality of wireless modems of the vehicle and each wireless access point employing a beamforming directional antenna having a main beam for establishing the mm wave radio communication link, at least one access point of the plurality of access points being able to establish mm wave radio communication links to a plurality of wireless modems using different main beams and being arranged to select between the different main beams for a data packet in dependence on a network address of the data packet;
   a plurality of segment multipath controllers, each multipath segment controller having multipath connections coupled to at least some access points of a network segment of the plurality of network segments for multipath communication with a complementary segment multipath controller of the vehicle, the network segment for a segment multipath controller being different for different segment multipath controllers of the plurality of segment multipath controllers; and
   a root multipath controller having multipath connections coupled to the plurality of segment multipath controllers and being arranged to perform multipath communication with a complementary root multipath controller of the vehicle.

7. The fixed network of claim 6, wherein the root multipath controller is coupled to the plurality of segment multipath controllers via a Layer 3 routed network section.

8. The fixed network of claim 6, wherein at least one segment multipath controller is coupled to the at least some access points via a Layer 2 switched network section.

9. The fixed network of claim 6, wherein the root multipath controller is arranged to communicate data with the complementary root multipath controller using data packet tunneling, each of at least some subflows between the root multipath controller and the complementary root multipath controller being a data packet tunnel.

10. The fixed network of claim 9, wherein the data packet tunneling utilizes UDP data packets.

11. The fixed network of claim 6, wherein at least one segment multipath controller of the plurality of segment multipath controllers is arranged to communicate data with a complementary segment multipath controller using data packet tunneling, each of at least some subflows between the at least one segment multipath controller and the complementary segment multipath controller being a data packet tunnel.

12. The fixed network of claim 11, wherein the tunneling utilizes UDP data packets.

13. The fixed network of claim 6, wherein the root multipath controller is not arranged to allocate data to paths of the plurality of segment multipath controllers in response to a radio link condition indication for any mm wave radio communication link.

14. The fixed network of claim 6, wherein the root multipath controller is arranged to allocate data to paths of the plurality of segment multipath controllers in response to transport layer properties for the paths.

15. The fixed network of claim 6, wherein the root multipath controller is arranged to allocate data to paths of the plurality of segment multipath controllers independently of allocation of data to paths of the at least some access points by the plurality of segment multipath controllers.

16. The fixed network of claim 6, wherein each network segment comprises at least one gateway and communication across a segment edge is via the at least one gateway.

17. The fixed network of previous claim 16, wherein the gateways are Internet gateways.

18. The fixed network of claim 6, wherein each network segment of the plurality of network segments has a different subnet IP address range.

19. The fixed network of any of claim 6, wherein latency for communication within each network segment of the plurality of network segments is lower than latency for communication between network segments of the plurality of network segments.

20. The fixed network of claim 6 wherein the root multipath controller is arranged to process data for the vehicle only for a subset of service classes out of a plurality of service classes supported by the fixed network.

21. A method of operation for a communication system for supporting communication between at least one end node of a vehicle and at least one remote correspondent node via a fixed network comprising a plurality of network segments, the communication system comprising:
  a plurality of wireless modems, each wireless modem being arranged to establish a mm wave radio communication link to an access point of a plurality of wireless access points of the fixed network, each wireless access point having a directional antenna arrangement for mm wave radio communication using directional beams, each wireless modem being located on the vehicle and employing an electronically steerable beamforming directional antenna having a main beam for establishing the first mm wave radio communication link;
  a plurality of segment multipath controllers located on the vehicle, each multipath segment controller having multipath connections coupled to the plurality of wireless modems for the network segment being different for different segment multipath controllers of the plurality of segment multipath controllers, and
  a root multipath controller located on the vehicle and having multipath connections coupled to the plurality of segment multipath controllers;
the method comprising:
  the plurality of segment multipath controllers performing multipath communication with a complementary segment multipath controller of a network segment of the fixed network; and
  the root multipath controller performing multipath communication with a complementary root multipath controller of the fixed network.

22. A method of operation for a fixed network for a communication system supporting communication between at least one end node of a vehicle and at least one remote correspondent node via the fixed network, the fixed network comprising a plurality of network segments and:
  a plurality of access points, each access point being arranged to establish a mm wave radio communication link to a wireless modem of a plurality of wireless modems of the vehicle and each wireless access point employing a beamforming directional antenna having a main beam for establishing the first mm wave radio communication link, at least one access point of the plurality of access points being able to establish mm wave radio communication links to a plurality of wireless modems using different main beams and being arranged to select between the different main beams for a data packet in dependence on a network address of the data packet;
  a plurality of segment multipath controllers, each multipath segment controller having multipath connections coupled to at least some access points of a network segment of the plurality of network segments, the network segment for a segment multipath controller being different for different segment multipath controllers of the plurality of segment multipath controllers; and
  a root multipath controller having multipath connections coupled to the plurality of segment multipath controllers;
the method comprising:
  the plurality of segment multipath controllers performing multipath communication with a complementary segment multipath controller of the vehicle; and
  the root multipath controller performing multipath communication with a complementary root multipath controller of the vehicle.

* * * * *